(12) United States Patent
Quan et al.

(10) Patent No.: US 8,154,612 B2
(45) Date of Patent: Apr. 10, 2012

(54) SYSTEMS, METHODS, AND APPARATUS FOR IMAGE PROCESSING, FOR COLOR CLASSIFICATION, AND FOR SKIN COLOR DETECTION

(75) Inventors: Shuxue Quan, San Diego, CA (US); Chinchuan Andrew Chiu, San Diego, CA (US); Xiaoyun Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1940 days.

(21) Appl. No.: 11/208,261

(22) Filed: Aug. 18, 2005

(65) Prior Publication Data
US 2007/0043527 A1   Feb. 22, 2007

(51) Int. Cl.
*H04N 5/228* (2006.01)
*A61B 6/00* (2006.01)
*G06K 9/00* (2006.01)

(52) U.S. Cl. ............... 348/222.1; 600/475; 382/171; 382/165

(58) Field of Classification Search .................. None
See application file for complete search history.

(56) References Cited

U.S. PATENT DOCUMENTS

| | | | | |
|---|---|---|---|---|
| 5,888,879 A * | 3/1999 | Nishikata et al. | ............. | 424/401 |
| 6,072,496 A * | 6/2000 | Guenter et al. | ............... | 345/419 |
| 6,178,341 B1 * | 1/2001 | Macfarlane et al. | .......... | 600/310 |
| 6,249,317 B1 * | 6/2001 | Hashimoto et al. | .......... | 348/364 |
| 6,488,622 B1 * | 12/2002 | Weiss | ............. | 600/306 |
| 6,549,653 B1 * | 4/2003 | Osawa et al. | ................ | 382/162 |
| 7,459,696 B2 * | 12/2008 | Schomacker et al. | ..... | 250/458.1 |
| 7,728,904 B2 | 6/2010 | Quan et al. | | |
| 2002/0012461 A1 * | 1/2002 | MacKinnon et al. | ......... | 382/164 |
| 2002/0072671 A1 | 6/2002 | Chenal et al. | | |
| 2004/0179719 A1 * | 9/2004 | Chen et al. | ..................... | 382/118 |
| 2005/0207643 A1 * | 9/2005 | Lee et al. | ...................... | 382/165 |
| 2006/0092441 A1 | 5/2006 | Quan et al. | | |

FOREIGN PATENT DOCUMENTS

| | | | |
|---|---|---|---|
| JP | 2002131135 A | 5/2002 |
| JP | 2003507847 T | 2/2003 |
| JP | 2003111108 A | 4/2003 |
| JP | 2003172659 A | 6/2003 |

OTHER PUBLICATIONS

Marimont, D., et al., "Linear Models of Surface and Illuminant Spectra" Journal of the Optical Society of America A (Optics and Image Science) USA, vol. 9, No. 11, Nov. 1992, pp. 1905-1913, XP002463102, ISSN: 0740-3232. Miaohong, S., et al., "Using Reflectance Models for Color Scanner Calibration" Journal of the Optical Society of America A (Optics, Image Science and Vision) Opt. Soc. America USA, vol. 19, No. 4, Apr. 2002, pp. 645-656, XP002463078, ISSN: 0740-3232.
Vrhel, M., et al., "Color Device Calibration: A Mathematical Formulation" IEEE Transactions on Image Processing IEEE USA, vol. 8, No. 12, Dec. 1999, pp. 1796-1806, XP002463079, ISSN: 1057-7149.
International Search Report—PCT/US06/032303, International Search Authority—European Patent Office—Jan. 14, 2008.
Written Opinion—PCT/US2006/032303, International Search Authority, European Patent Office, Jan. 14, 2008.

* cited by examiner

*Primary Examiner* — Long V. Le
*Assistant Examiner* — Lawrence Laryea
(74) *Attorney, Agent, or Firm* — Kyong H. Macek; James R. Gambale, Jr.

(57) ABSTRACT

Embodiments include a method of image processing including decomposing a reflectance spectrum for a test surface into a linear combination of reflectance spectra of a set of test targets. The coefficient vector calculated in this decomposition is used to predict a response of an imaging sensor to the test surface. A plurality of such predicted responses may be used for various applications involving color detection and/or classification, including human skin tone detection.

23 Claims, 16 Drawing Sheets

| Dark skin 0.400 0.350 10.1 | Light skin 0.377 0.345 35.8 | Blue sky 0.247 0.251 19.3 | Foliage 0.337 0.422 13.3 | Blue flower 0.265 0.240 24.3 | Bluish green 0.261 0.343 43.1 |
|---|---|---|---|---|---|
| Orange 0.506 0.407 30.1 | Purplish blue 0.211 0.175 12.0 | Moderate red 0.453 0.306 19.8 | Purple 0.285 0.202 6.6 | Yellow green 0.380 0.489 44.3 | Orange yellow 0.473 0.438 43.1 |
| Blue 0.187 0.129 6.1 | Green 0.305 0.478 23.4 | Red 0.539 0.313 12.0 | Yellow 0.448 0.470 59.1 | Magenta 0.364 0.233 19.8 | Cyan 0.196 0.252 19.8 |
| White 0.310 0.316 90.0 | Neutral 8 0.310 0.316 59.1 | Neutral 6.5 0.310 0.316 36.2 | Neutral 5 0.310 0.316 19.8 | Neutral 3.5 0.310 0.316 9.0 | Black 0.310 0.316 3.1 |

FIG. 1

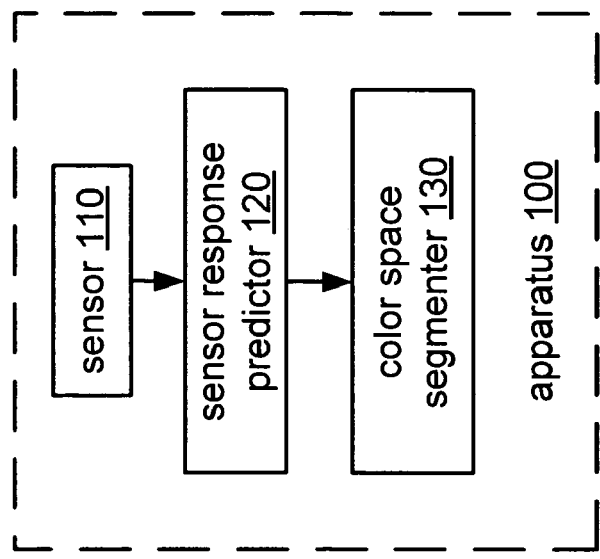
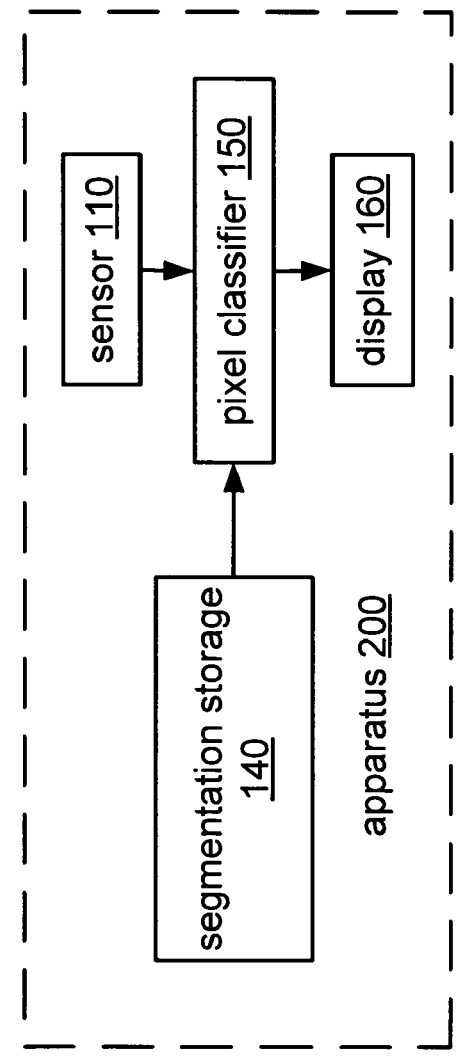

SYSTEMS, METHODS, AND APPARATUS FOR IMAGE PROCESSING, FOR COLOR CLASSIFICATION, AND FOR SKIN COLOR DETECTION

FIELD OF THE INVENTION

This invention relates to image processing.

BACKGROUND

The presence of skin color is useful as a cue for detecting people in real-world photographic images. Skin color detection plays an important role in applications such as people tracking, blocking mature-content web images, and facilitating human-computer interaction. Skin color detection may also serve as an enabling technology for face detection, localization, recognition, and/or tracking; video surveillance; and image database management. These and other applications are becoming more significant with the adoption of portable communications devices, such as cellular telephones, that are equipped with cameras. For example, the ability to localize faces may be applied, to a more efficient use of bandwidth by coding a face region of an image with better quality and using a higher degree of compression on the image background.

The reflectance of a skin surface is usually determined by its thin surface layer, or "epidermis," and an underlying thicker layer, or "dermis." Light absorption by the dermis is mainly due to ingredients in the blood such as hemoglobin, bilirubin, and beta-carotene, which are basically the same for all skin types. However, skin color is mainly determined by the epidermis transmittance, which depends on the dopamelanin concentration and hence varies among human races.

Skin color appearance can be represented by using this reflectance model and incorporating camera and light source parameters. The main challenge is to make skin detection robust to the large variations in appearance that can occur. Skin appearance changes in color and shape, and it is often affected by occluding objects such as clothing, hair, and eyeglasses. Moreover, changes in intensity, color, and location of light sources can affect skin appearance, and other objects within the scene may complicate the detection process by casting shadows or reflecting additional light. Many other common objects are easily confused with skin, such as copper, sand, and certain types of wood and clothing. An image may also include noise appearing as speckles of skin-like color.

One conventional approach to skin detection begins with a database of hundreds or thousands of images with skin area (such as face and/or hands). This database serves as a training set from which statistics distinguishing skin regions from non-skin regions may be derived. The color space is segmented according to these statistics, and classifications are made based on the segmentation. One disadvantage is that the database images typically originate from different cameras and are taken under different illuminations.

SUMMARY

A method of characterizing a sensor includes obtaining a first plurality of points in a color space. Each of the first plurality of points is based on an observation by the sensor of a corresponding target. The method also includes obtaining a second plurality of points in the color space. Each of the second plurality of points corresponds to a portion of a corresponding one of a plurality of surfaces. Each of the second plurality of points is also based on (1) a reflectance spectrum of the portion of the surface and (2) a plurality of reflectance spectra, where each of the plurality of reflectance spectra corresponds to one of the observed targets. In some applications of such a method, all of the plurality of surfaces belong to a class having a common color characteristic, such as the class of human skin surfaces.

A method of image processing includes receiving an image captured by a sensor. The method also includes classifying each of a plurality of pixels of the image according to a predetermined segmentation of a color space. The predetermined segmentation is based on a plurality of predicted responses of the sensor.

An image processing apparatus includes an image sensor, an array of storage elements configured to store a segmentation, and a pixel classifier.

BRIEF DESCRIPTION OF THE DRAWINGS

FIG. 1 shows a schematic diagram of a Macbeth ColorChecker.

FIG. 17A shows a block diagram of an apparatus 100 according to an embodiment.

FIG. 17B shows a block diagram of an apparatus 200 according to an embodiment.

DETAILED DESCRIPTION

Figure 2:
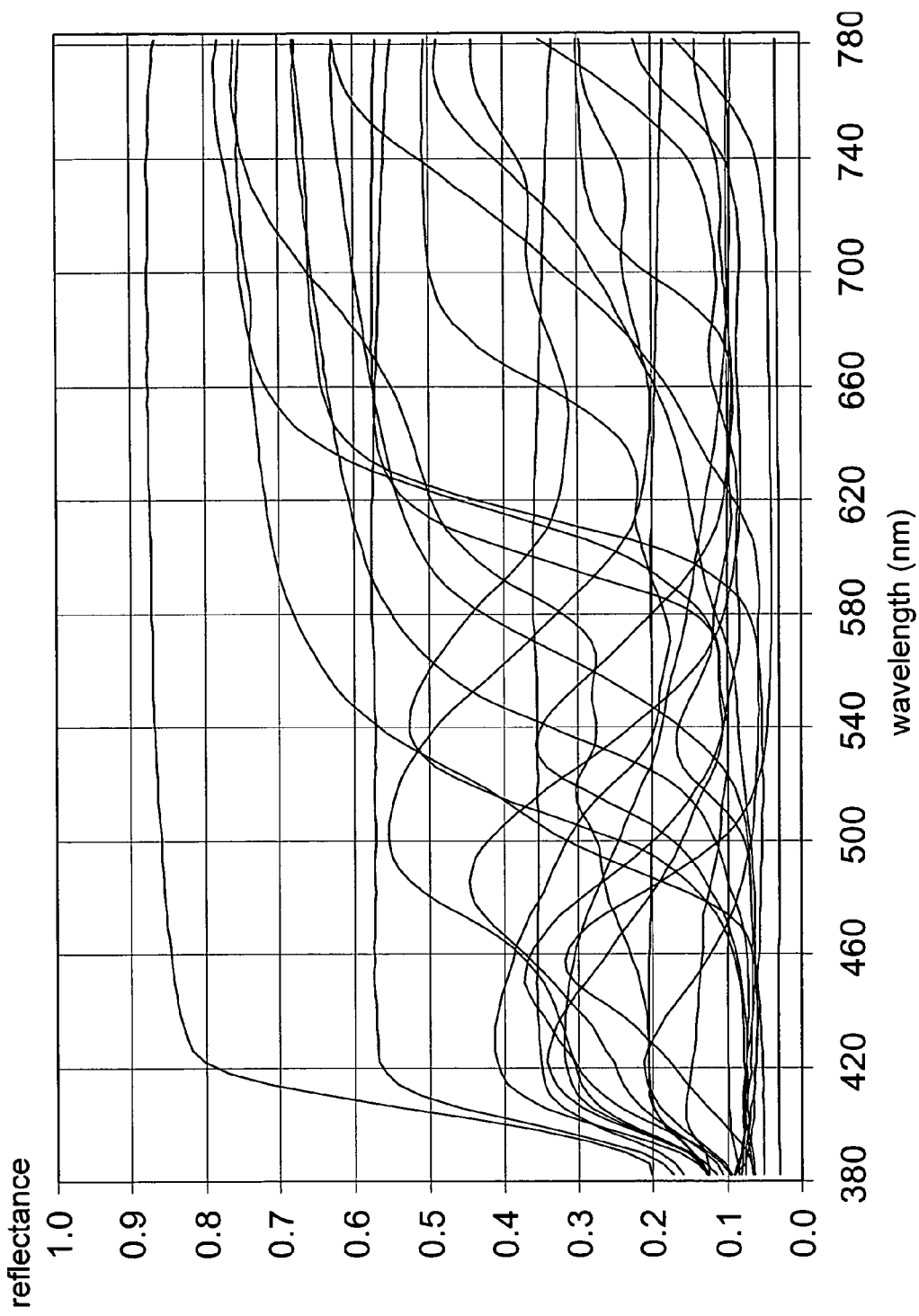
FIG. 2 shows a plot of the reflectance spectra of the 24 patches of a Macbeth ColorChecker over the range of 380 to 780 nanometers.

Embodiments described herein include procedures in which skin color statistics are established for a specific electronic sensor based on a correlation of skin color spectra and spectra of a set of testing targets (for example, a Macbeth ColorChecker). The skin-tone area may then be detected from an image captured with this sensor based on its skin color statistics. After a skin region is detected, methods can be applied to improve skin tone, such as by enhancing the color so that a preferred color is obtained. The detected skin color may also be used to enhance the 3A process (autofocus, auto-white balance, and auto-exposure) for a camera using this sensor.

Embodiments described herein also include procedures for sensor-dependent skin color detection, in which characteristics of the sensor are calibrated based on an imaging procedure. A skin tone region is then modeled based on a correlation of a training set of skin color reflectance spectra and the reflectance spectra of standard test targets used to calibrate the sensor.

A representation of an illuminated surface point as produced by an imaging sensor may be modeled according to the following expression:

$$S = \int_{400nm}^{700nm} SS(\lambda)L(\lambda)R(\lambda)\,d\lambda, \tag{1}$$

where S denotes the signal produced by the sensor; $SS(\lambda)$ denotes the sensor spectral sensitivity as a function of wavelength $\lambda$; $L(\lambda)$ denotes the power spectral distribution of the illuminating light source, or the relative energy of the light source as a function of wavelength $\lambda$; and $R(\lambda)$ denotes the reflectance spectrum of the surface point being imaged, or the relative reflectance of the imaged point as a function of wavelength $\lambda$.

If values for the functions on the right-hand side of expression (1) may be obtained or reliably estimated, then expression (1) may be applied to predict a response of the sensor to an illuminated point of the surface. Usually the power spectral distribution $L(\lambda)$ of the light source can be measured easily. Alternatively, the light source may be characterized using an illuminant, or a spectral power distribution of a particular type of white light source (as published, for example, by the International Commission on Illumination (CIE) (Wien, Austria)). If the type of illuminant is known or may be deduced or estimated, then a standardized distribution expressing a relation between relative energy and wavelength may be used instead of measuring the light source's output spectrum. Likewise, the reflectance spectrum $R(\lambda)$ of a surface may be measured or estimated from a database of spectra of like surfaces. However, the sensor sensitivity function $SS(\lambda)$ is usually unknown and expensive to acquire.

Measurement of the spectral sensitivity function $SS(\lambda)$, for a sensor such as a CCD (charge-coupled device) or CMOS (complementary metal-oxide-semiconductor) image sensor is typically a time-consuming process that requires special expensive equipment such as a monochromator and a spectraradiometer. The cost of measuring this function directly may render such measurement infeasible for sensors intended for mass-produced consumer products. The sensor spectral sensitivity may also vary as a function of illumination intensity and possibly other factors (such as temperature, voltage, current, characteristics of any filter in the incoming optical path, presence of radiation at other wavelengths such as infrared or ultraviolet, etc.). Compensation for these factors may include limiting the use of expression (1) to a particular range of illumination intensity and/or including an infrared- or ultraviolet-blocking filter in the incoming optical path.

Other methods of predicting a sensor response are described herein. We assume that a reflectance spectrum of a surface may be represented as a linear combination of other reflectance spectra. For example, we assume that a reflectance spectrum of a surface $R_{surface}$ may be represented as a linear combination of the reflectance spectra $R_i^{target}$ of a set of m targets:

$$R_{surface} = \sum_{i=1}^{m} b_i R_i^{target}. \tag{2}$$

Based on expressions (1) and (2), we conclude that a predicted response of the sensor to the surface point $S^*_{surface}$ may be represented as a linear combination of the sensor responses to each of the set of targets $S_i^{target}$, $1 \leq i \leq m$, according to the coefficient vector b from expression (2):

$$S^*_{surface} = \sum_{i=1}^{m} b_i S_i^{target}. \tag{3}$$

It may be desired to obtain a predicted sensor response $S^*$ in a color space native to the sensor, such as an RGB space. For example, expression (3) may be rewritten to represent the raw RGB signal of the surface point, as observed by a sensor, as a linear combination of the RGB signals of the set of targets as observed by the same sensor under similar illumination:

$$(RGB)^*_{surface} = \sum_{i=1}^{m} b_i (RGB)_i^{target}. \tag{3a}$$

In a method according to an embodiment, the coefficient vector b is derived according to a relation such as expression (2) above, using known values for the reflectance spectra of a surface and of a set of targets. These spectra may be measured or otherwise obtained or estimated (for example, from a database). The vector b is then applied according to a relation such as expression (3) above to predict a sensor response for the surface.

The m targets may be surfaces having standardized color values, such as patches of a pre-printed standardized target set. One such target set that is a widely accepted and readily available standard for color imaging applications is the Macbeth ColorChecker (Amazys Holding AG, Regensdorf, Switzerland). The Macbeth ColorChecker is a physical target set having 24 dyed color patches including a series of six gray patches, typical additive (red, green, blue) and subtractive (cyan, magenta, yellow) primaries, and other "natural" colors such as light and dark skin, sky-blue, and foliage. The color pigments of the Macbeth ColorChecker were selected to minimize any metamerism, or change of perceived color upon changing the illuminating light source.

FIG. 1 shows a schematic diagram of the Macbeth ColorChecker, in which the location of each patch is indicated with the name of the corresponding color and its value in the CIE xyY color space. FIG. 2 shows a plot of the reflectance spectra of the 24 patches of the ColorChecker over the range of 380 to 780 nm. Other examples of standardized target sets include without limitation the ColorCheckerDC target set (Amazys Holding AG; having 237 color patches); the 1269 Munsell color patches (Munsell Book of Color, Munsell Color Corporation, 1976); IT8-7.2 (reflective) target sets such as a Kodak Q-60R1 target set, which contains approximately 260 color patches printed on photographic paper (Eastman Kodak Company, Rochester, N.Y.); and the Kodak Q-13 and Q-14 target sets.

In deriving the coefficient vector b, it may be desirable to reduce or prune the set of basis functions to include only those target spectra that make a significant contribution to the resulting combinations for the particular application. The number of patches used m need not be the same as the number of patches of the target set, as some patches may not be used and/or patches from more than one target set may be included.

The reflectance spectra of the test surface and of the targets may be provided as vectors of length n representing samples of the relative reflectance at a number n of points across a range of wavelengths, such that expression (2) may be written in the following form:

$$\vec{R}_{surface} = R^{target} \vec{b} \tag{2a}$$

where $\vec{R}_{surface}$ and $\vec{b}$ are column vectors of length n; and $R^{target}$ is a matrix of size m×n, with each column corresponding to a particular wavelength and each row corresponding to a particular target. For example, the reflectance spectra may be sampled at an interval of 4 nanometers (or 10 or 20 nanometers) across a range of visible wavelengths such as 380 (or 400) to 700 nanometers.

It may be desired in some cases to sample only a portion of the visible range and/or to extend the range beyond the visible in either direction (for example, to account for reflectance of infrared and/or ultraviolet wavelengths). In some applications, it may be desired to sample the range of wavelengths at intervals which are not regular (for example, to obtain a greater resolution in one or more subranges of interest, such as a range including the principal wavelengths of a camera flash).

Expression (2a) may be solved for coefficient vector b as a least-squares problem. In a case where the matrix $R^{target}$ is not square, the coefficient vector b may be calculated according to the following expression:

$$\vec{b} = (R^{target})^+ \vec{R}_{surface}, \tag{2b}$$

where the operator $(\cdot)^+$ denotes the pseudoinverse. The Moore-Penrose pseudoinverse is a standard function in software packages with matrix support such as Mathematica (Wolfram Research, Inc., Champaign, Ill.) or MATLAB (MathWorks, Natick, Mass.), and it may be calculated using the singular value decomposition or an iterative algorithm.

To ensure that the predicted sensor response signals correspond to linear combinations of sensor responses to the targets, the constructed skin color reflectance spectra should be consistent with the original spectra. Calculation of the coefficient vector b may include a verification operation to compare the original and calculated spectra and/or an error minimization operation to reduce error, possibly including iteration and/or selection among more than one set of basis spectra.

Figure 3:
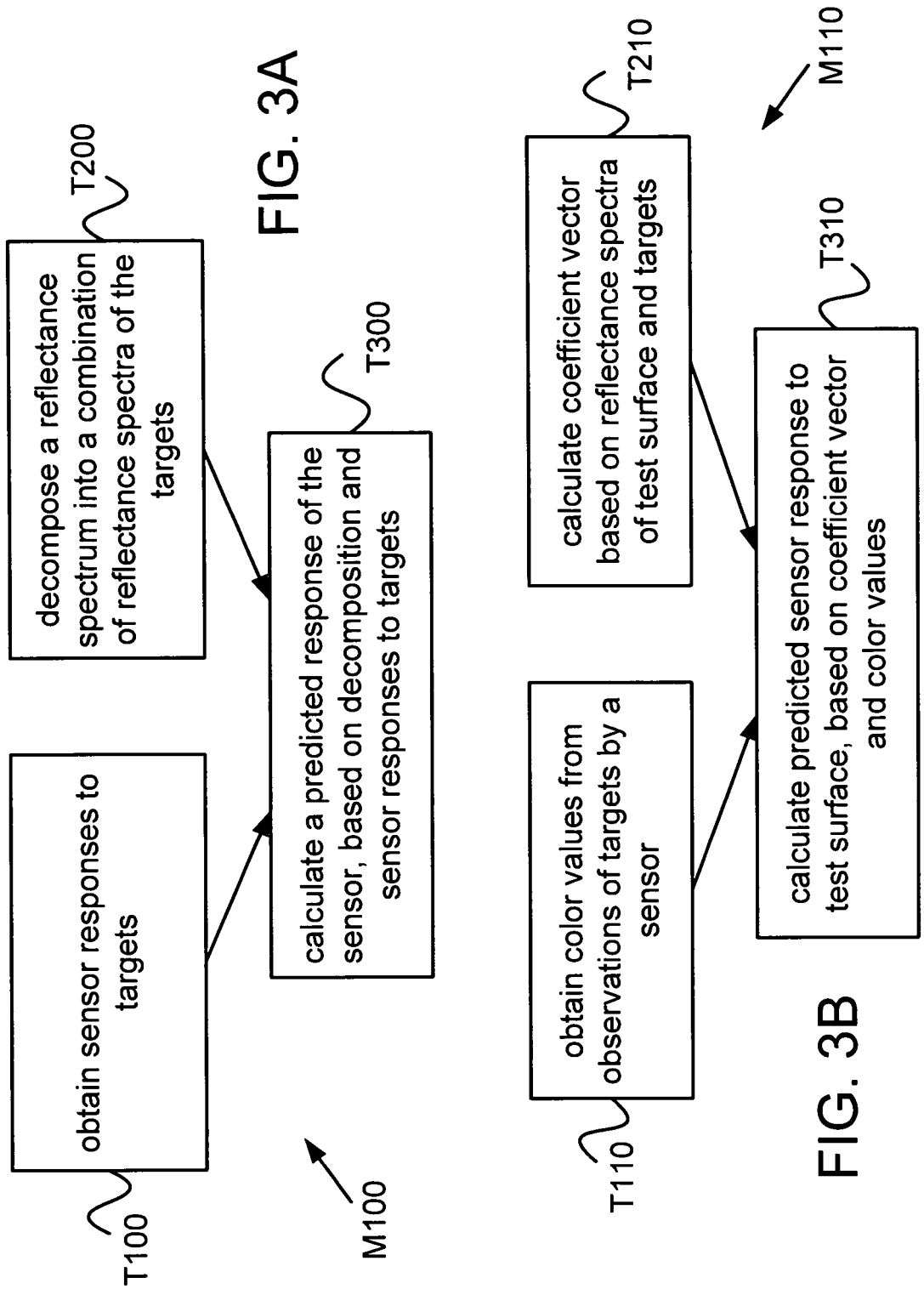
FIG. 3A shows a flowchart of a method M100 according to an embodiment.
FIG. 3B shows a flowchart of an implementation M110 of method M100.

FIG. 3A shows a flowchart of a method M100 according to an embodiment. Task T100 obtains sensor responses to a number of different targets. Task T200 decomposes a reflectance spectrum of a surface into a combination of reflectance spectra of the targets. Task T300 calculates a predicted response of the sensor to the surface based on the decomposition and the sensor responses. During measurement of the sensor responses, it may be desired to approximate characteristics of an optical path to the sensor that is expected to occur in a later application, such as a spectral transmittance of a camera lens and/or presence of filters such as infrared- and/or ultraviolet-blocking filters.

Figure 4:
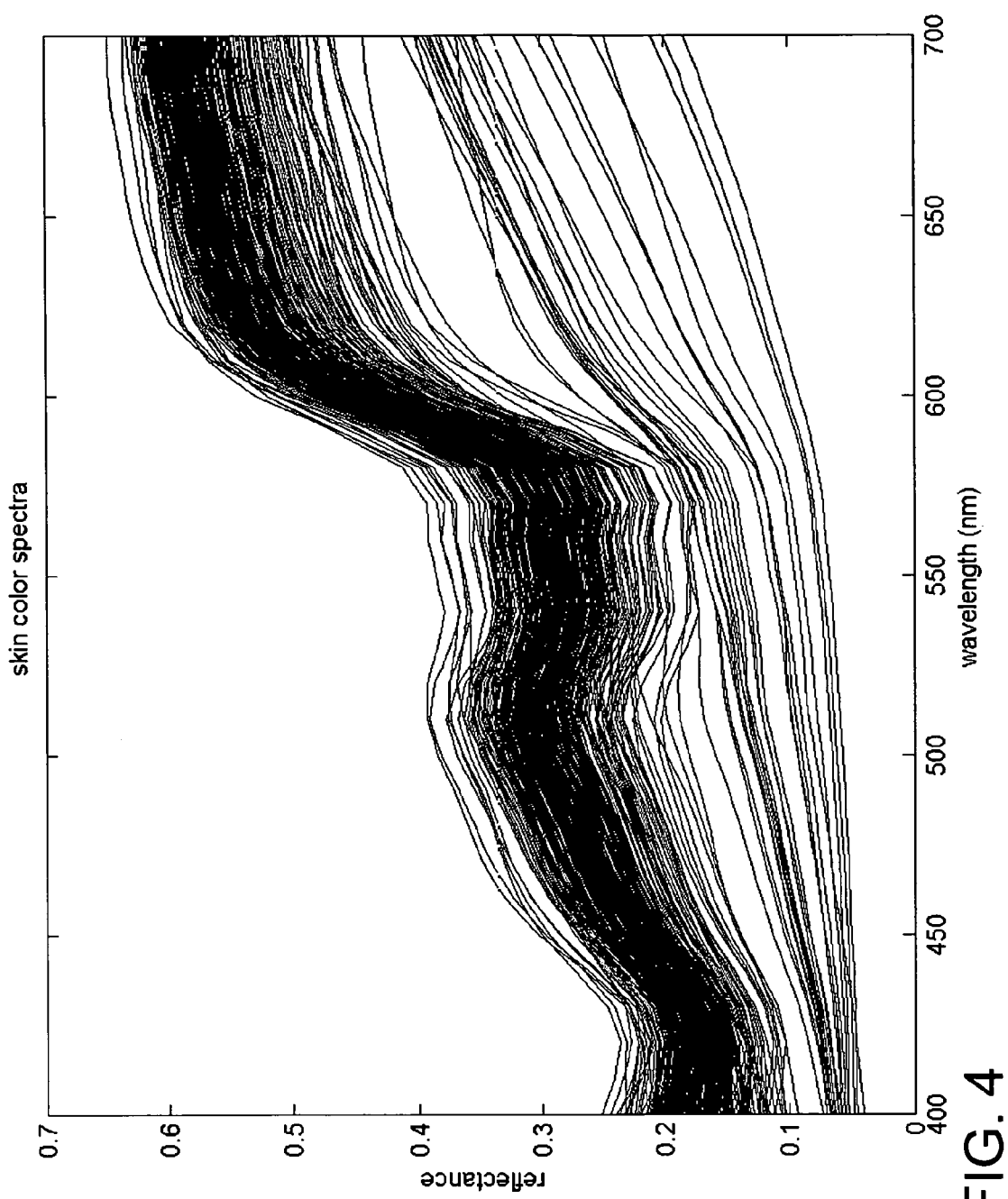
FIG. 4 shows a plot of the reflectance spectra for a number of different instances of human skin.

The range of applications for method M100 includes classification and detection of human skin color. A database of reflectance spectra measured for dozens, hundreds, or more different human skin surface patches may be used to obtain data points that define a skin color region in a color space such as RGB or YCbCr. One database of skin color reflectance spectra that may be used is the Physics-based Face Database of the University of Oulu (Finland), which contains 125 different faces captured under four different illumination and four different camera calibration conditions, with the spectral reflectance of each face being sampled three times (forehead and both cheeks). One or more instances of method M100 may be performed for each spectrum in the database. FIG. 4 shows a plot of the reflectance spectra of a sample set of human skin surface patches.

FIG. 3B shows a flowchart of an implementation M110 of method M100. Task T110 is an implementation of task T100 that obtains a plurality of color values, each based on an observation by a sensor of a corresponding point of a standard target. Task T210 is an implementation of task T200 that calculates a coefficient vector based on reflectance spectra of a test surface and of the targets. Task T310 is an implementation of task T300 that calculates a predicted response of the sensor to the test surface, based on the coefficient vector and the color values.

Task T100 obtains sensor responses to a number of different targets, such as patches of a Macbeth ColorChecker. It is possible to consider the individual response of each pixel of the sensor, such that method M100 is performed independently for each pixel, although considerable computational resources would be involved. Alternatively, task T100 may be configured to obtain the sensor response to each target as an average response (mean, median, or mode) of a number of pixels observing the target.

Task T200 decomposes a reflectance spectrum of the test surface into a combination of reflectance spectra of the targets. In one example, task T200 decomposes the test surface spectrum into a linear combination of reflectance spectra of Macbeth ColorChecker patches.

Task T300 calculates a predicted sensor response based on the decomposition of task T200 (for example, based on a coefficient vector indicating a linear combination) and the sensor responses obtained in task T100. In one example, the predicted sensor response is an RGB value calculated as a linear combination of RGB values from Macbeth ColorChecker patches observed under the same illuminant:

$$\begin{pmatrix} R \\ G \\ B \end{pmatrix}^*_{surface} = \begin{pmatrix} \vec{R} \\ \vec{G} \\ \vec{B} \end{pmatrix}_{target} \vec{b}, \tag{3b}$$

where $\vec{R}$, $\vec{G}$, and $\vec{B}$ are row vectors of the red, green, and blue values for each of the targets, respectively; and $\vec{b}$ is a column coefficient vector calculated in task T200.

Figure 5:
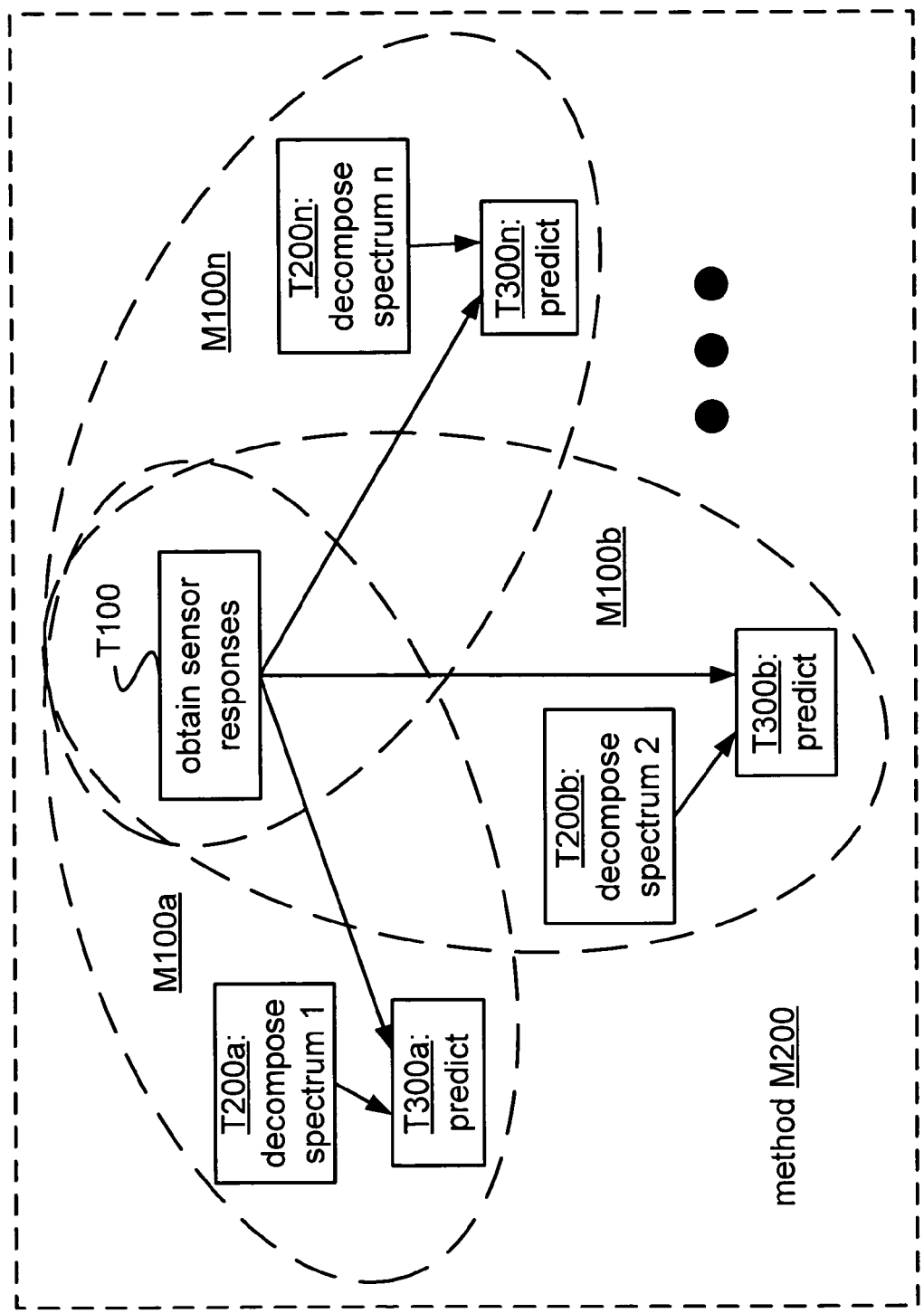
FIG. 5 shows a flowchart of a method M200 according to an embodiment, including multiple instances of method M100 having a common instance of task T100.

Method M100 may be performed for each of a plurality of test surfaces, with the various instances M100a, M100b, M100n of method M100 being performed serially and/or in parallel. In such case, it may be desired for the sensor responses obtained in one instance of task T100 to be used by several or all of the instances M100a, M100b, M100n of method M100 and the corresponding tasks T200a and T300a, T200b and T300b, T200n and T300n, respectively. FIG. 5 shows a flowchart of a method M200 that includes n such instances of method M100, each producing a predicted response of the sensor to a corresponding one of n test surfaces. The predicted sensor responses may be used to analyze or classify images captured with the same sensor. For example, the n test surfaces may be selected as representative of a particular class of objects or surfaces, such as human skin.

In a further configuration, several instances of task T100 are performed, with a different illuminant being used in each instance. For example, the sensor responses in one instance of task T100 may be obtained under an incandescent illumination generally conforming to CIE Illuminant A, while the sensor responses in another instance of task T100 are obtained under a daylight illumination generally conforming to CIE Illuminant D65, while the sensor responses in a further instance of task T100 are obtained under a fluorescent illumination generally conforming to CIE Illuminant TL84. In such case, it may be desired to perform several instances of method M100 for each test surface, with each instance using sensor responses from a different illuminant instance of task T100.

Figure 6:
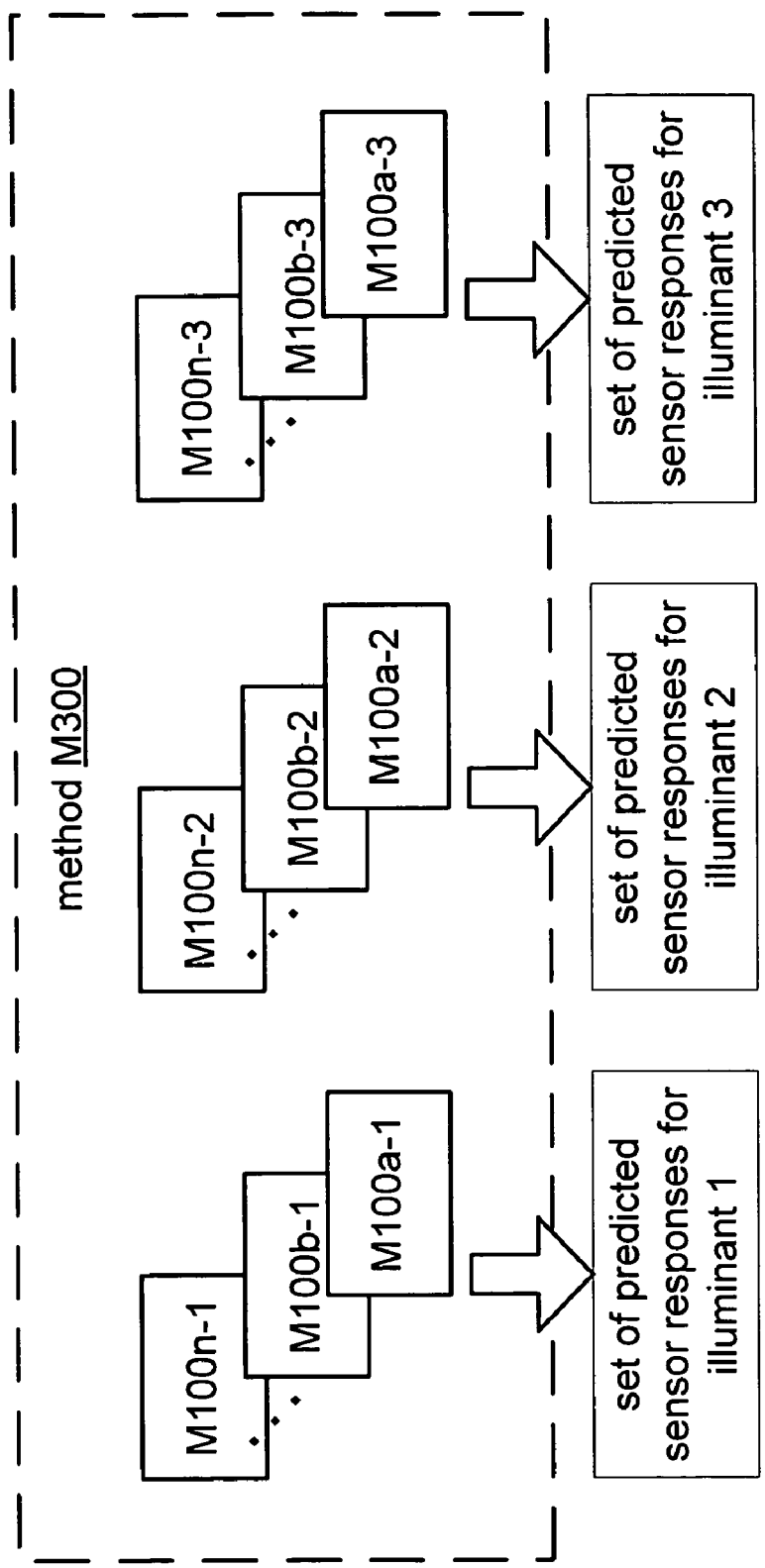
FIG. 6 shows a block diagram of a method M300 according to an embodiment.

FIG. 6 shows a block diagram of a method M300 according to an embodiment, in which an operation of obtaining predicted sensor responses for several different illuminants is combined with an operation of obtaining a predicted sensor response for each of a plurality of test surfaces by performing multiple instances M100a-1, M100b-1, M100n-1; M100a-2, M100b-2, M100n-2; M100a-3, M100b-3, M100n-3 of the method M100, as shown in FIG. 5 to obtain a set of predicted sensor responses for each of the several illuminants. A different set of illuminants than the set mentioned above may be selected. For example, it may be desired to select a set of illuminants according to a desired sampling of the range of illumination color temperatures expected to be encountered in the particular application. Other reference illuminants that may be used to obtain sensor responses in instances of task T100 include daylight illuminants such as CIE D50 (representing daylight at sunrise or sunset, also called horizon light); CIE D55 (representing daylight at mid-morning or mid-afternoon); CIE D75 (representing overcast daylight); and CIE C (representing average or north sky daylight), and fluorescent illuminants such as one or more of the CIE F series.

It may be desirable to use the sensor in an application in which further signal processing may be performed. For example, it will usually be desired to perform operations on images captured by the sensor to correct for defects in the sensor array, to compensate for nonidealities of the response and/or of other components in the optical or electrical signal path, to convert the sensor output signal into a different color space, and/or to calculate additional pixel values based on the sensor output signal. Such signal processing operations may be performed by one or more arrays of logic elements that may reside in the same chip as the sensor (especially in the case of a CMOS sensor) and/or in a different chip or other location. Signal processing operations are commonly performed on photographic images in a digital camera, or a device such as a cellular telephone that includes a camera, and in machine vision applications.

In such an application, it may also be desirable to classify one or more pixels of an image captured by the sensor according to a segmentation based on predicted responses of the sensor, as described in more detail herein. In a case where the image to be classified will have undergone a set of signal processing operations (such as black clamping, white balance, color correction and/or gamma correction, as described below), it may be desired to process the predicted responses of the sensor according to a similar set of signal processing operations. For example, the native color space of the sensor may be a primary color space such as a RGB space, while it may be desired to perform classification and/or detection operations in a luminance-chrominance space such as a YCbCr space.

Figure 7B:
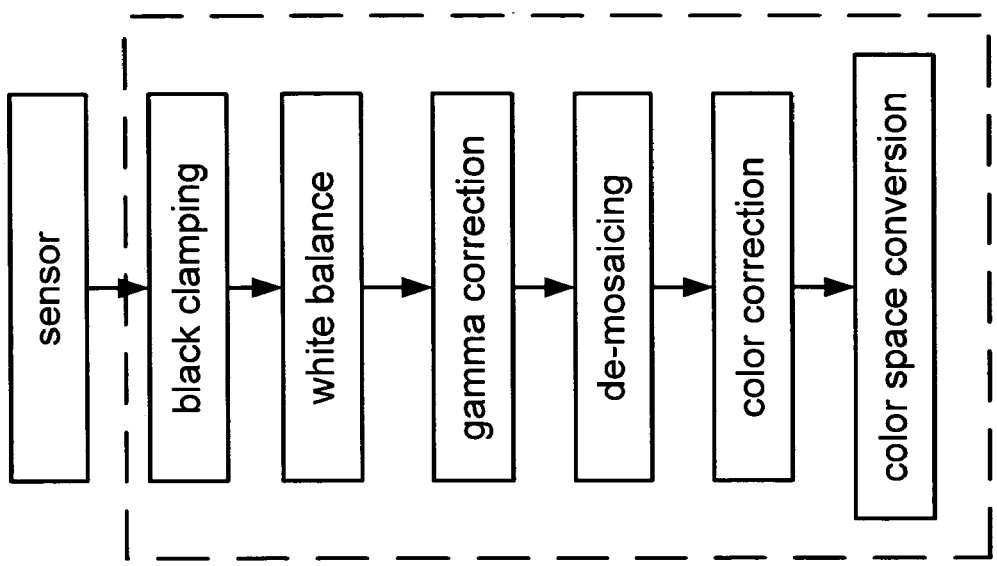
FIGS. 7A and 7B show block diagrams of two examples of a signal processing pipeline.
Figure 7A:
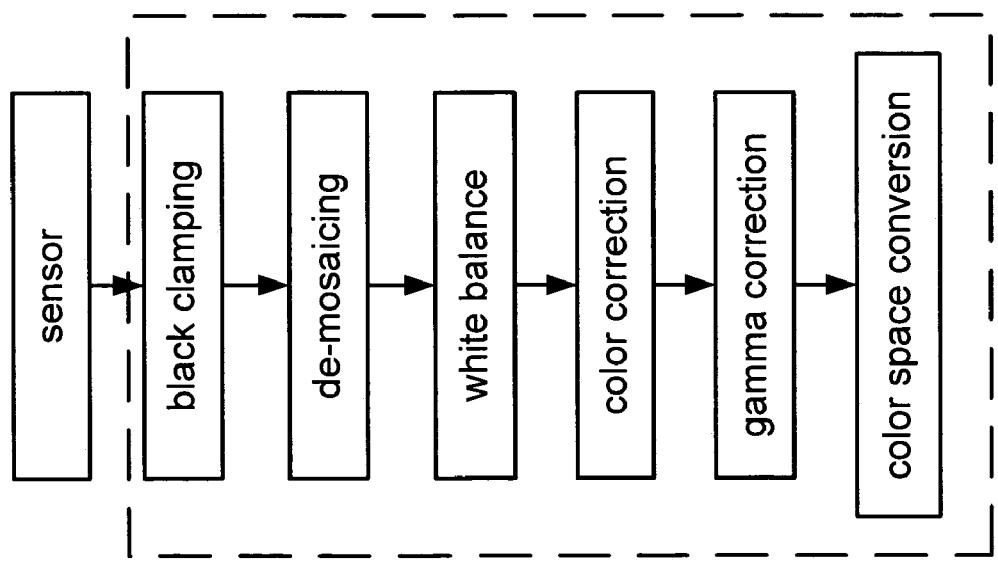

FIG. 7A shows an example of a signal processing pipeline in which native color values produced by a sensor are transformed into processed color values in a different color space. FIG. 7B shows another example of such a signal processing pipeline in which the operations in FIG. 7A are performed in a different sequence. These operations are described in more detail below. Depending on the application, a signal processing pipeline may omit any of these operations and/or may include additional operations, such as compensation for lens distortion and/or lens flare. One or more of the signal processing operations may be optimized beforehand in a manner that is specific to the sensor and/or may apply parameters whose values are determined based on a response of the sensor.

The accuracy of the predicted sensor response signals may depend to some degree on linearity of the sensor response, which may vary from pixel to pixel, from channel to channel, and/or from one intensity level to another. One common sensor nonideality is additive noise, a large portion of which is due to dark current noise. Dark current noise occurs even in the absence of incident light and typically increases with temperature. One effect of dark current noise is to elevate the pixel values such that the level of an unilluminated (black) pixel is not zero. A dark current compensation operation (also called "black clamping") may be performed to reduce the black pixel output to zero or another desired value, or to reduce the black pixel output according to a desired offset value.

One common method of dark current compensation is black level subtraction, which includes subtracting an offset from each pixel value. The offset may be a global value such that the same offset is subtracted from each pixel in the image. This offset may be derived from one or more pixels that are outside the image area and are possibly masked. For example, the offset may be an average of such pixel values. Alternatively, a different offset value may be subtracted from each pixel. Such an offset may be derived from an image captured in the absence of illumination, with each pixel's offset being based on the dark output of that pixel.

Sensor nonidealities may also include multiplicative noise, in which different pixels of the sensor respond to the same stimulus with different degrees of gain. One technique for reducing multiplicative noise is flat-fielding, in which the pixel values are normalized by a factor corresponding to capture of an image of a uniform gray surface. The normalization factor may be a global value derived from some or all of the pixels in the gray image, such as an average of such pixel values. Alternatively, a different normalization factor may be applied to each pixel, based on the response of that pixel to the uniform gray surface.

In one configuration of task T100, raw RGB signals for each patch of a Macbeth ColorChecker under the corresponding illuminant are normalized by flat fielding through a uniform gray plane capture and subtraction of a constant black level:

$$RGB' = \frac{RGB - Blacklevel}{GrayPlane - BlackLevel}, \quad (4)$$

where BlackLevel is a black level offset and GrayPlane is a normalization factor. Such an operation may be performed before or after de-mosaicing.

In one example, the sensor responses for the various targets are derived from a single captured image of the entire basis set of targets such as a Macbeth ColorChecker, or from an average of a number of images of the entire basis set of targets. In such case, the value of GrayPlane may be selected as an average of the pixel values that correspond to a gray patch of the targets (which patch may or may not be included in the basis set of targets). In other examples, each captured image used in task T100 includes fewer than all (perhaps only one) of the basis set of targets.

Figures 8A, 8B, 9:
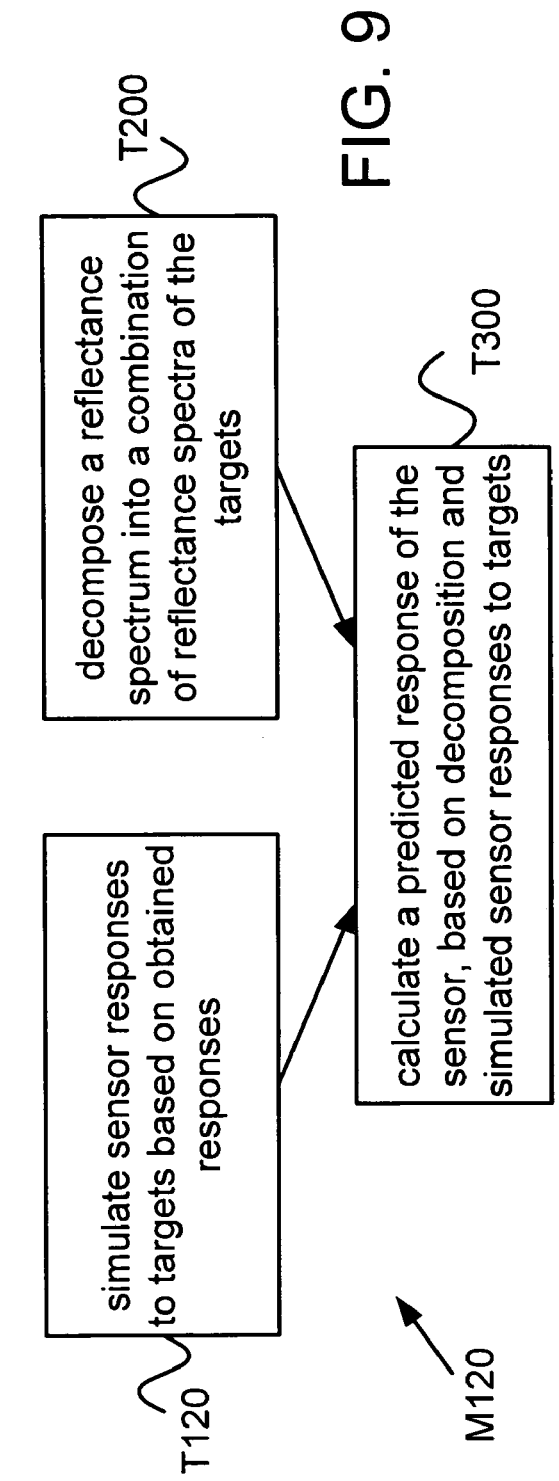
FIGS. 8A and 8B show two examples of color filter arrays.
FIG. 9 shows a flowchart of an implementation M120 of method M100.

An image sensor such as a CCD or CMOS sensor typically includes an array of light-sensitive elements having similar spectral responses. In order to capture a color image from such an array, a color filter array may be placed in front of the array of light-sensitive elements. Alternatively, a color filter array may be incorporated into the array of light-sensitive elements such that different elements will respond to different color components of the incident image. FIG. 8A shows one common filter array configuration, the red-green-blue Bayer array. In this array, every other pixel of each row and column responds to green, as the human eye is more sensitive to green wavelengths than to red or blue. FIG. 8B shows another example of a color filter array, a cyan-magenta-yellow-green configuration that may be especially suited for scanning applications. Many other examples of color filter arrays are known, are in common use, and/or are possible.

Because each pixel behind a color filter array responds to only the color corresponding to its filter, the color channels of the resulting image signal are spatially discontinuous. It may be desirable to perform an interpolation operation to estimate color values for pixel locations in addition to the color values that were captured. For example, it may be desirable to obtain an image having red, green, and blue values for each pixel from a raw image in which each pixel has only one of a red, green, and blue value. Such interpolation operations are commonly called "de-mosaicing." A de-mosaicing operation may be based on bilinear interpolation and may include operations for avoidance, reduction, or removal of aliasing and/or other artifacts. The processing pipeline may also include other spatial interpolation operations, such as interpolation of values for pixels known to be faulty (for example, pixels that are always on, or always off, or are otherwise known to have a response that is constant regardless of the incident light).

The color temperature of a white surface typically varies between 2000K and 12000K, depending upon the incident illumination. While the human eye can adjust for this difference such that the perception of a white surface remains relatively constant, the signal outputted by an image sensor will usually vary significantly depending upon the scene illumination. For example, a white surface may appear reddish in an image captured by a sensor under tungsten illumination, while the same white surface may appear greenish in an image captured by the same sensor under fluorescent illumination.

An imaging application will typically include a white balance operation to compensate for light source differences. One example of a white balance operation includes adjusting the relative amplitudes of the color values in each pixel. A typical white balance operation on an RGB image includes adjusting the red and blue values relative to the green value according to a predetermined assumption about the color balance in the image, as in the following expression:

$$\begin{bmatrix} R' \\ G' \\ B' \end{bmatrix} = \begin{bmatrix} g_R & 0 & 0 \\ 0 & 1 & 0 \\ 0 & 0 & g_B \end{bmatrix} \begin{bmatrix} R \\ G \\ B \end{bmatrix}. \quad (5)$$

In expression (5), the gain factors for the red channel $g_R$ and for the blue channel $g_B$ may be selected based on one of these common assumptions, in which the parameters x and y refer to the spatial coordinates of the image:

1) Assume a maximal sensor response for each color channel (assume that the maximum value in the image is white):

$$g_R = \max_{(x,y)} G(x,y) \Big/ \max_{(x,y)} R(x,y).$$

2) Assume that all color channels average to gray (gray-world assumption):

$$g_R = \sum_{(x,y)} G(x,y) \Big/ \sum_{(x,y)} R(x,y).$$

3) Assume equal energy in each color channel:

$$g_R = \sum_{(x,y)} G^2(x,y) \Big/ \sum_{(x,y)} R^2(x,y).$$

The gain factor for the blue channel $g_B$ is determined relative to the green channel in a similar fashion.

A white balance operation may be adjusted for images that are highly chromatic, such as a close-up of a flower, or other images in which the assumption may not hold. A white balance operation may also be selected according to prior knowledge of the power spectral distribution of a camera flash, such as a triggered-discharge device (flash tube) or a high-lumen-output light-emitting diode (LED), and knowledge that the image was captured using the flash. It is also possible to use different white balance operations for pixel values of different intensities, which may help to compensate for nonlinearities in the sensor response.

A white balance operation may correct for a strong color cast due to the color temperature of the scene illumination and may move sensor responses to the same surface under different illuminations closer in the color space. However, color nonidealities may remain in the image due to idiosyncrasies in the spectral response of the particular sensor, and clusters of responses to the same set of similar test surfaces under different illuminations may be shifted with respect to each other in the color space even after the white balance operation is applied. It may be desirable to perform a color correction operation to further compensate for sensor-dependent differences in response to different illuminants.

A color correction operation may include multiplying color value vectors of the image pixels by a color correction matrix specific to the sensor. In one example, the correction matrix is derived from images of a standard target set, such as a Macbeth ColorChecker, which are captured using the sensor. Images of the target set may be captured under different illuminations, and a different matrix may be derived for each corresponding illuminant. For example, illuminations corresponding to daylight (CIE D65), tungsten light (CIE A), and fluorescent light (TL84) may be used to provide a sampling of a broad range of color temperatures, and the appropriate matrix may be selected based on an illuminant analysis of the image to be corrected.

A color correction matrix may be optimized for white point compensation, or it may be optimized for a class of colors important to a particular application (such as skin tone). Different color correction matrices may be used for different pixel intensities, which may reduce effects of differing nonlinearities in sensor response among the color channels.

The set of signal processing operations may also include a gamma correction operation, such as a nonlinear mapping from an input range of values to an output range of values according to a power function. Gamma correction is commonly performed to correct a nonlinear response of a sensor and/or display, and such an operation may be performed at the end of a sequence of signal processing operations (before or after a color space conversion) or earlier, such as before a color filter array interpolation operation. The gamma correction may be selected to produce a signal conforming to a standard profile such as NTSC, which is gamma compensated for nonlinear display response.

It may be desired to compensate for a difference between the sensor response and the desired color space. For example, it may be desired to transform color values from a native RGB space, which may be linear, into a standardized color space such as sRGB, which may be nonlinear. Such a conversion may be included in a gamma correction operation. Gamma correction may be omitted in an application in which the sensor and display responses are both linear and no further use of the image signal is desired.

A gamma curve may also be selected according to one or more sensor-specific criteria. For example, selection of a desired gamma correction may be performed according to a method as disclosed in U.S. patent application Ser. No. 11/146,484, filed Jun. 6, 2005, entitled "APPARATUS, SYSTEM, AND METHOD FOR OPTIMIZING GAMMA CURVES FOR DIGITAL IMAGE DEVICES."

It may be desirable to obtain the predicted skin color values in a different color space than the one in which the target images were captured. Images from digital cameras are typically converted into YCrCb color space for storage and processing. For example, compression operations according to the JPEG and MPEG standards are performed on values in YCbCr space. It may be desired to perform operations based on the predicted values, such as classification and detection, in this color space rather than the color space native to the sensor.

It may otherwise be desired to perform operations based on the predicted values in a luminance-chrominance space, in which each color value includes a luminance value and chromatic coordinates. For example, it may be desired to subdivide the color space in a manner that is accomplished more easily in such a space. In one such division, the YCbCr space is divided into several chrominance subspaces or planes, each corresponding to a different range of luminance values.

The following matrix may be applied to convert a color value from sRGB space to YCbCr space:

$$\begin{bmatrix} +0.289 & +0.587 & +0.114 \\ -0.169 & -0.441 & +0.500 \\ +0.500 & -0.418 & -0.081 \end{bmatrix} \begin{bmatrix} R_{sRGB} \\ G_{sRGB} \\ B_{sRGB} \end{bmatrix} = \begin{bmatrix} Y \\ C_b \\ C_r \end{bmatrix}. \quad (6)$$

Similar matrices may be applied to perform conversion between two device-dependent color spaces, such as from sRGB to a CMYK space, or from a device-dependent space to a device-independent space such as CIEXYZ or CIELab. In some implementations, it may be desired to display an image signal that has been converted to YCbCr space. In such case the signal may be converted back to sRGB space using, for example, an inverse of the matrix in expression (6) for display on a device such as a LCD (liquid crystal display) or OLED (organic light-emitting diode) panel.

An instance of method M100 may be performed to obtain a predicted sensor response signal for each of a number of test surface spectra. An instance of method M100 may also be performed to obtain a predicted sensor response for each of a number of test surface spectra for each of a number of different illuminations. In a further embodiment, it may be desired to obtain more predicted sensor response signals for each available test surface spectrum.

In one implementation, the number of predicted sensor responses is increased by simulating different levels of illumination intensity. In one such configuration, the sensor response is assumed linear, and the native color space of the sensor output is a primary color space such as RGB. Each primary color channel of the sensor responses captured in task T100 is multiplied by a scaling factor k, and an additional predicted response is obtained by performing task T300 on the modified set of sensor responses. Such a procedure may be performed for each available test surface spectrum to effectively double the number of predicted values, and the procedure may also be repeated for different values of k. In other configurations, different scaling factors may be applied to each of the different primary color channels according to a known or estimated nonlinearity. If a illumination level simulation procedure is repeated for five or ten different illumination levels for all of the available test surface spectra, the number of predicted values may be increased by a corresponding factor of five or ten, although any other number of simulated illumination levels may also be used.

Noise statistics of the sensor may also be applied to increase the number of predicted sensor responses by modifying the sensor response obtained in task T100. These noise statistics may be measured from images of one or more standard targets captured by the sensor. For example, a configuration of task T100 may include capturing target images that are used to calculate noise statistics of the sensor, which images may also be among those used in calculating the predicted sensor responses.

For each of one or more of the color channels, a noise measure (such as one standard deviation) is derived from some or all of the pixel values corresponding to one of the m targets in the basis set. The noise measure(s) are then applied to the corresponding channel value(s) of the target response obtained in task T100 to obtain a simulated response, which may include adding each noise measure to (or subtracting it from) the channel value. This procedure may be repeated for all of the other targets in the basis set, or it may be desired to leave one or more of the target responses unchanged. Task T300 is then performed on the new set of m sensor responses to obtain an additional predicted sensor response. Such a procedure may be used to increase the number of predicted sensor responses by a factor of two or more. In other configurations, other noise statistics (such as a multiplicative factor that may be applied to a corresponding primary color channel of some or all of the m targets) may be derived and applied.

FIG. 9 shows a flowchart of an implementation M120 of method M100. Method M120 includes an implementation T120 of task T100 that simulates sensor responses to targets based on obtained responses. For example, task T120 may simulate sensor responses based on different illumination levels and/or noise statistics of the sensor, as described above.

Figure 10:
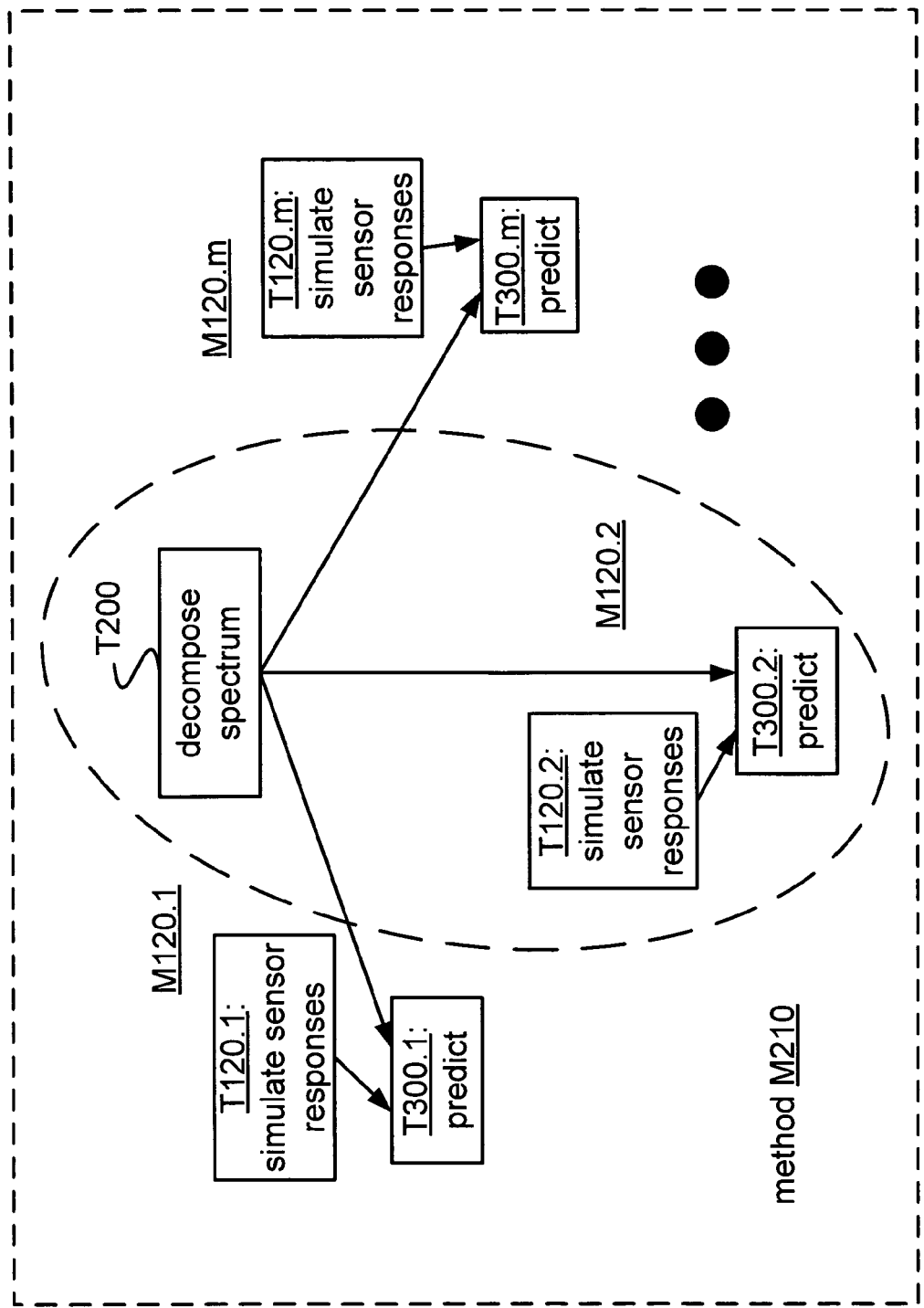
FIG. 10 shows a flowchart of a method M210 according to an embodiment, including multiple instances of method M120 having a common instance of task T200.

FIG. 10 shows a flowchart of a method M210 that includes n such instances M120.1, M120.2, M120.m of method M120, each producing a different predicted response of the sensor by executing tasks T120.1 and T300.1, T120.2 and T300.2, T120.m and T300.m, respectively, to the test surface whose reflectance spectrum is decomposed in a common instance of task T200.

Figure 11:
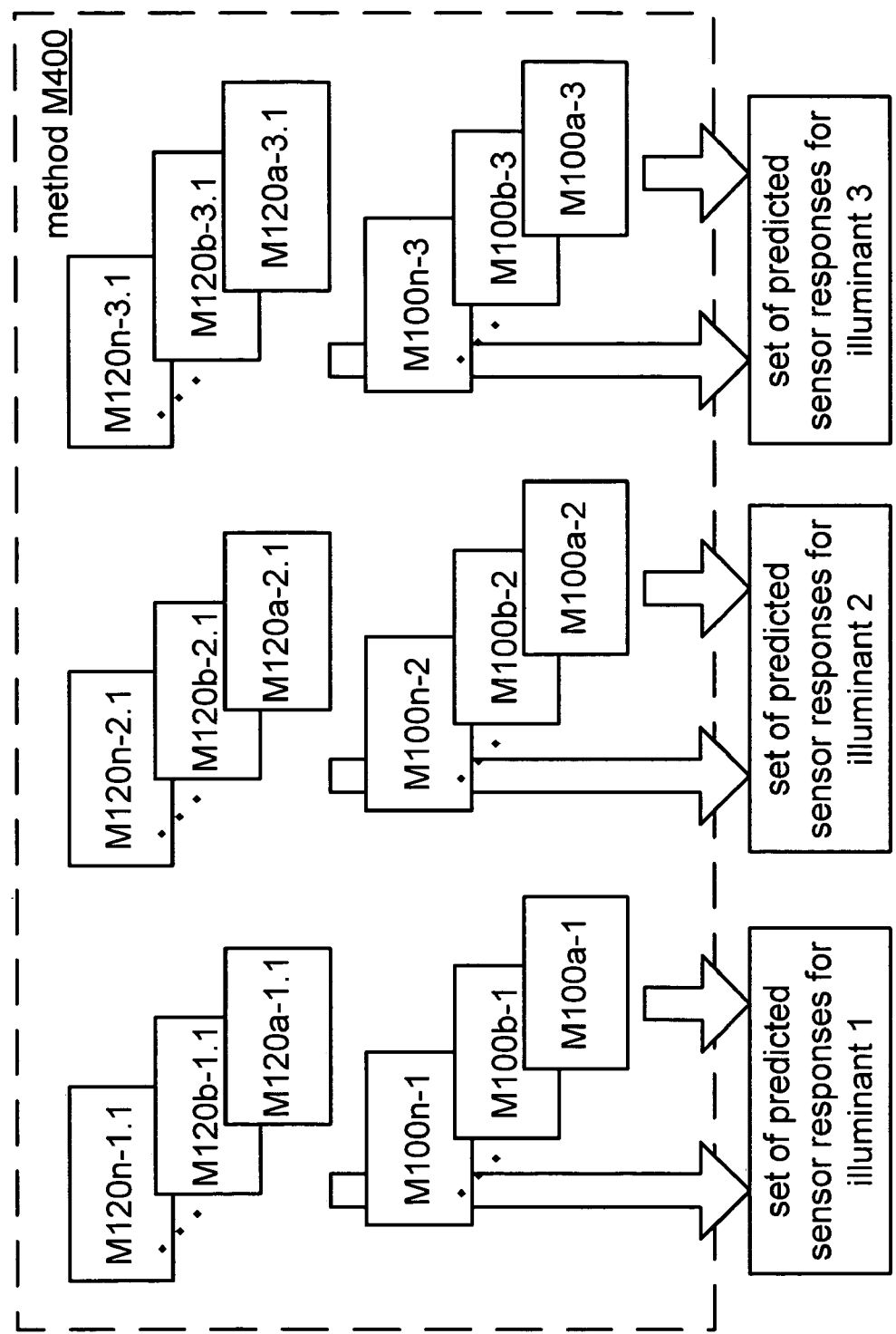
FIG. 11 shows a block diagram of a method M400 according to an embodiment.

FIG. 11 shows a block diagram of a method M400 according to an embodiment, in which operations of obtaining predicted sensor responses for several different illuminants, of obtaining a predicted sensor response for each of a plurality of test surfaces, and of obtaining a predicted sensor response based on simulated sensor responses are combined to obtain larger sets of predicted sensor responses for each of the several illuminants. It may be desirable to configure an implementation of method M400 such that instances M100a-1, M100b-1, M100n-1; M100a-2, M100b-2, M100n-2; M100a-3, M100b-3, M100n-3 of method M100 and instances M120a-1.1, M120b-1.1, M120n-1.1; M120a-2.1, M120b-2.1, M120n-2.1; M120a-3.1, M120b-3.1, M120n-3.1 of method M120, respectively, which operate according to the same illuminant and test surface share a common instance of task T200.

Figure 12:
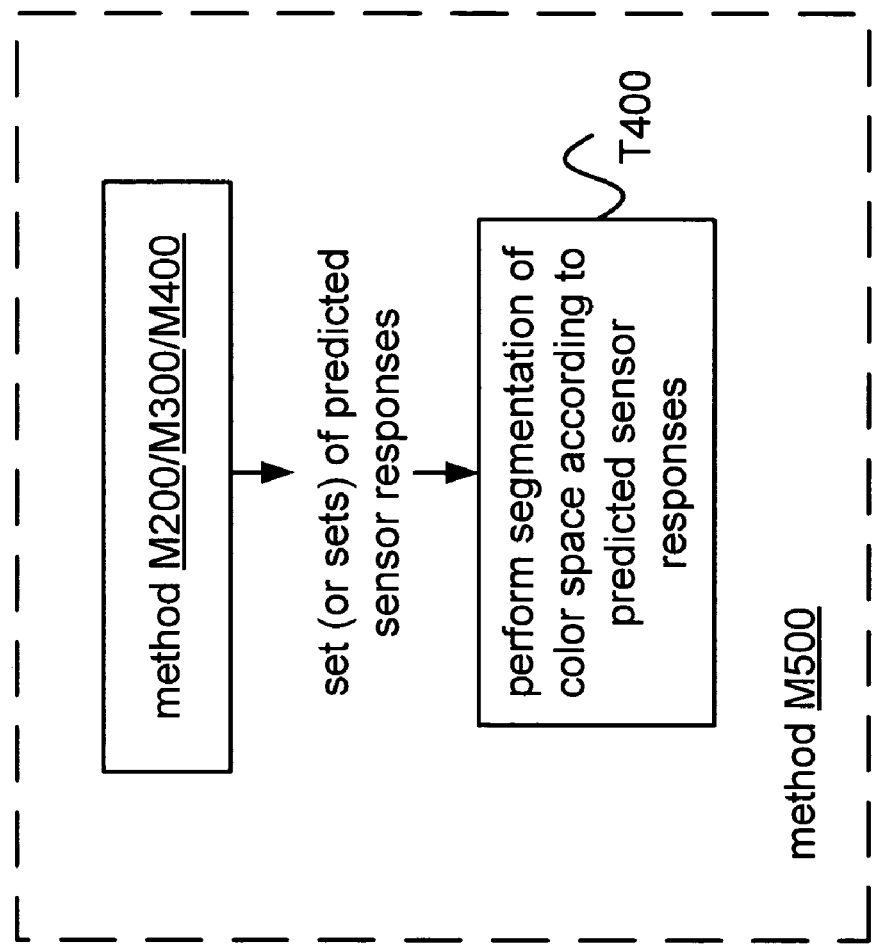
FIG. 12 shows a flowchart of a method M500 according to an embodiment.

FIG. 12 shows a block diagram of a method M500 according to an embodiment that includes a task T400. Task T400 performs a segmentation of a color space according to a training set that includes one or more sets of predicted sensor responses, as calculated by one or more implementations of method M200, M300, and/or M400. It may be desirable to select the test surfaces from which the training set is derived, and/or to select the elements of the training set, such that the segmentation describes a common color characteristic of a class of surfaces (for example, the class of human skin tones). The color space is a portion (possibly all) of the color space from which the training set samples are drawn, such as RGB or YCbCr. In one example, the color space is a chrominance plane, such as a CbCr plane. A potential advantage of using a training set based on characteristics of the particular sensor is a reduced cluster, which may increase reliability and/or reduce the probability of false detections.

The segmentation may be exclusive, such that each location (color value) in the color space is in one and only one of the segments. Alternatively, each of some or all of the locations in the color space may be assigned a probability less than one of being in one segment and, at least implicitly, a probability greater than zero of being in another segment.

Task T400 may be configured to perform the segmentation based on a histogram of the training set. For example, task T400 may be configured to determine a probability that a color space location i is within a particular segment based on a sum $M_i$ of the number of occurrences of the location among the predicted sensor responses. For each location i in the color space portion, task T400 may be configured to obtain a binary (probability one or zero) indication of membership of the location in the segment by comparing $M_i$ to a threshold value. Alternatively, task T400 may be configured to calculate a probability measure as a normalized sum of the number of occurrences of the location among the predicted sensor responses ($M_i/\max\{M_j\}$, for example, where the maximum is taken over all locations j in the color space being segmented; or $M_i/N$, where N is the number of samples in the training set).

It may be desirable to apply a lowpass filter or other form of local approximation to the probability measures and/or to the histogram from which the probability measures are derived. Such an operation may be used to reduce the effective number of probability measures to be stored (by downsampling the histogram, for example). Such an operation may also be used to provide appropriate probability measures for locations which are assumed to be within the segment but are poorly represented or even unrepresented among the predicted sensor responses.

While classification based on a histogram may be simple and fast, the effectiveness of such a technique may depend strongly on the density of the training data. Moreover, such classification may also be inefficient in terms of the amount of classification data it may require (for example, a mask having one or more probability measures for every location in the color space being segmented). In a further implementation, task T400 is configured to model the distribution of a class (such as human skin tone) over the color space.

Task T400 may be configured to model the distribution as a Gaussian function. Such a model may have the advantage of generality and may be simple and fast. In one example as applied to a chrominance space such as the CbCr plane, the likelihood of membership of a chrominance value vector $X_i$ in a segment is modeled as a Gaussian distribution according to the following expression:

$$P(X_i) = \frac{1}{2\pi|\Lambda|^{1/2}} \exp\left[-\frac{1}{2}\lambda^2\right] \quad (7)$$

where $X_i$ is a vector of the chrominance values for location i, the mean vector μ and the covariance matrix Λ are determined from the predicted sensor responses, and the Mahalanobis distance λ is calculated as $\lambda^2 = (X_i-\mu)^T \Lambda^{-1}(X_i-\mu)$. The Mahalanobis distance weights the distance between the sample and the mean according to the sample set's range of variability in that direction. Definition of the cluster in terms of the center and covariance matrix may provide a guarantee that a convex hull will be generated for any λ (assuming an unbounded color space, or assuming an upper limit on the value of λ according to the boundaries of the space).

One form of binary segmentation may be obtained from a model as set forth in expression (7) by applying a threshold $\lambda_T^2$, such that the value X is classified as within the segment if $\lambda^2 \leq \lambda_T^2$ and as outside the segment otherwise. The inequality $\lambda^2 \leq \lambda_T^2$ defines an elliptical area, centered at the mean μ, whose principal axes are directed along the eigenvectors $e_1$ of Λ and have length $\lambda_T \sqrt{\lambda_i}$, where $$\sum_l e_l = \lambda_i e_i.$$

In some applications, the distribution may be too complex to be modeled satisfactorily with a single Gaussian distribution. In a situation where illumination varies, for example, such a model may not adequately represent the variance of the distribution of the training set (such as a distribution of human skin color). In another example, the training set may include subclasses having different distributions. In such cases, modeling the histogram as a mixture of Gaussian distributions, such as a superposition of weighted Gaussians, may provide a more accurate model. For a mixture-of-Gaussians model, it may be desired to evaluate each of the Gaussians used for the model in order to generate the likelihood of membership for the location i.

Other models may also be used to model the class density distribution (or a portion thereof). One example of an elliptical boundary model that may be suitable is defined according to the following expression:

$$\Phi(X) = (X-\psi)^T \Theta^{-1} (X-\psi), \quad (8)$$

where n is the number of distinctive color space locations represented in the training set, $\psi$ is the mean of the n distinctive color space locations, and $$\Theta = \frac{1}{N} \sum_{q=1}^{n} M_q (X_q - \mu)(X_q - \mu)^T.$$

One form of binary segmentation may be obtained from a model as set forth in expression (8) by applying a threshold $\alpha$, such that the value $X_i$ is classified as within the segment if $\Phi(X_i) < \alpha$ and as outside the segment otherwise.

Task T400 may be configured to perform a segmentation by which a class represented by the training set of predicted sensor responses may be distinguished from all other values in the color space. However, the segmentation performed by task T400 need not be limited to a single class. For example, the training set of predicted sensor responses may include more than one subclass, and it may be desired for task T400 to perform a segmentation that can be used to distinguish between two or more of the subclasses. In such case, it may be desirable to use a mixture of Gaussians to model a histogram describing the distribution of the composite training set. Such a model may provide a boundary value between the subclasses that allows a more optimal separation than a threshold selected as a local minimum of the histogram.

A method may contain more than one instance of task T400, each configured to perform a different segmentation for different training sets. The various instances of task T400 may be executed serially and/or in parallel, in real-time or offline, and the training sets may or may not overlap. Usually the various instances of task T400 will perform a segmentation of the same color space, but the range of contemplated embodiments is not limited to such a feature, and the color spaces segmented by each instance of task T400 need not be identical. Applications of such a method include real-time analysis of a still image or one or more images of a video sequence captured by the sensor, where the sensor is included in a device such as a digital camera or a cellular telephone or other personal communications device that includes a camera.

Figure 13:
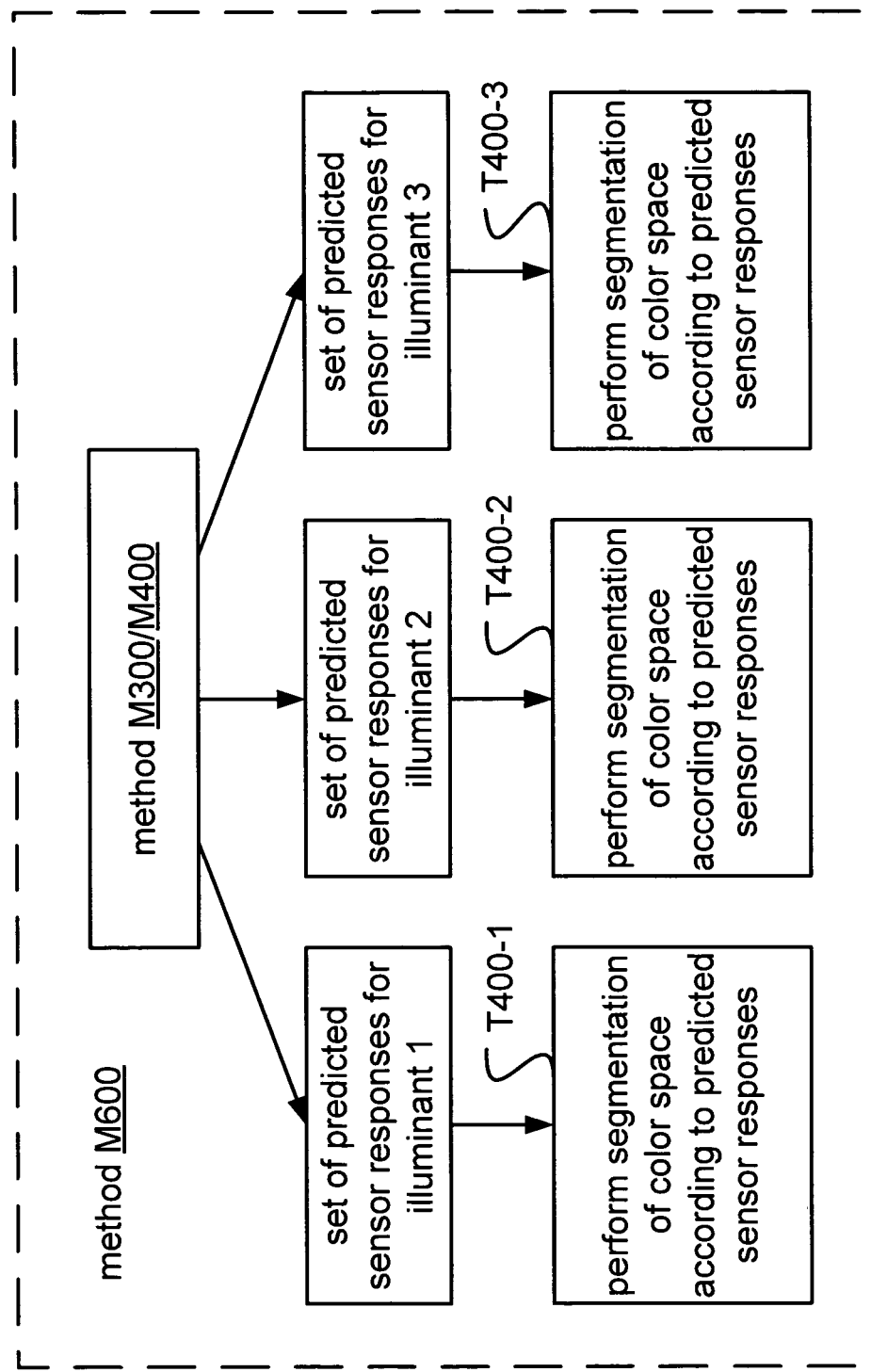
FIG. 13 shows a flowchart of a method M600 according to an embodiment.

FIG. 13 shows a flowchart of a method M600 according to such an embodiment, in which different sets of predicted sensor responses are used to perform color space segmentations. In this example, each set supports a different segmentation of the same color space according to a corresponding illuminant. In another example, a segmentation is based on a combination of one or more (possibly all) of the sets of predicted sensor responses corresponding to different reference illuminants. In some applications (for example, where the training set represents a class such as human skin color), it is possible that different segmentation regions may not overlap. In an implementation of method M600 in which one or more of the instances of task T400 applies a threshold to the distribution or model (for example, to obtain a binary segmentation), it is also possible for different instances T400-1, T400-2, T400-3 of task T400 to apply different thresholds.

It is commonly assumed that luminance does not affect the clustering of skin colors in a luminance-chrominance color space such as YCbCr. Accordingly, task T400 may perform a segmentation such that some or all of the color space is condensed into a single chrominance plane, such as a CbCr plane. In such an application, task T400 is configured to indicate a probability of membership based on location in the chrominance plane.

In another implementation, task T400 may be configured to perform a different segmentation for each of a number of different portions of a range of values of the color space. Contrary to the common assumption, for example, the inventors have observed that skin-color clusters may be larger for mid-range luminance values than for luminance values closer to the extremes. In some cases, the skin color region in YCbCr space is an ellipsoid that is clustered in the CbCr plane but is scattered along the Y axis.

In a further implementation as applied to such a case, task T400 divides the YCbCr space into a plurality of subspaces, each subspace corresponding to a range of luminance values. In one example, the space is divided into ten equal luminance ranges $\{(0, 0.1], (0.1, 0.2], \ldots, (0.8, 0.9], (0.9, 1.0)\}$, although in other examples any number of ranges may be used, and the ranges need not be equal. Task T400 may also be adapted for a situation where the YCbCr space extends between a pair of extreme values different than 0 and 1.0 (for example, between 0 and 255).

Such an implementation of task T400 may be used to separate skin colors into ten clusters, each in a respective chrominance plane. In one configuration, the distribution of skin color in each range is modeled as a Gaussian in the corresponding plane, such that the skin likelihood of an input chrominance vector X is given by an expression such as expression (7). Given a threshold $\lambda_T^2$, the value vector X may be classified as skin chrominance if $\lambda^2 \leq \lambda_T^2$ and as non-skin chrominance otherwise. It may be desirable to select a larger value for $\lambda_T$ when the luminance level is in the mid-range and a gradually smaller value as the luminance level approaches either of the two extremes. In other configurations, other models such as those described herein may be applied to model the training set distribution in each luminance range.

Figure 14A:
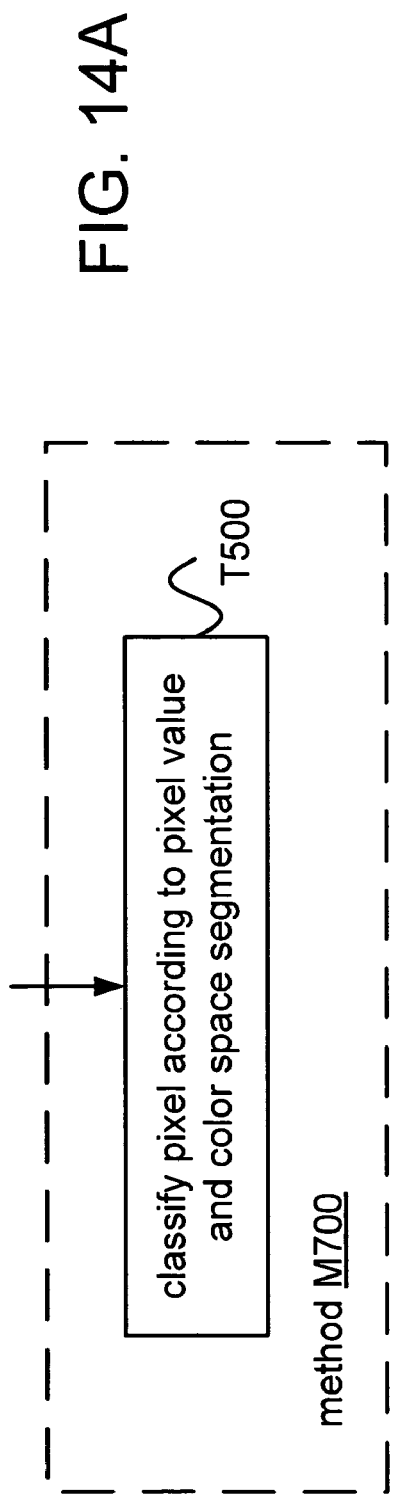
FIG. 14 shows a flowchart of a method M700 according to an embodiment.

FIG. 14A shows a block diagram, of a method M700 according to an embodiment. Task T500 classifies a pixel of an image captured by the sensor, based on a segmentation as performed in task T400 and the location of the pixel's value in the segmented color space. The segmentation may be predetermined such that it is established before the image is classified. Method M700 may be repeated serially and/or in parallel to classify some or all of the pixels in the image according to the segmentation.

Figure 14B:
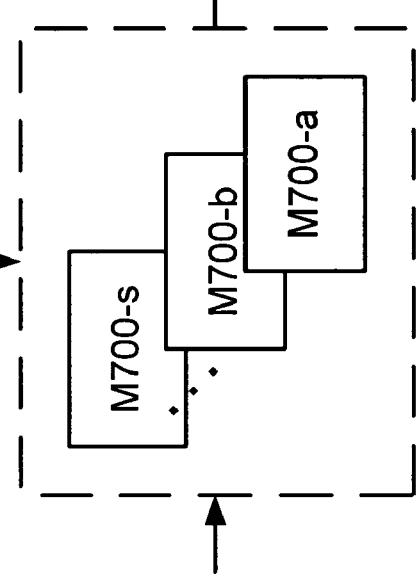

As shown in FIG. 14B, instances of method M700 may be performed in real time and/or offline for each of s pixels in an image captured by the sensor to obtain a segmentation map of the image. In one example, instances M700-a, M700-b, M700-s of method M700 are performed to obtain a binary segmentation map of the image, in which a binary value at each location of the map indicates whether the corresponding pixel of the image is in the segment or not. It may be desirable to perform filtering and/or other processing operations on a segmentation map of the image, such as morphological operations, region growing, low-pass spatial filtering, and/or temporal filtering.

Figure 15:
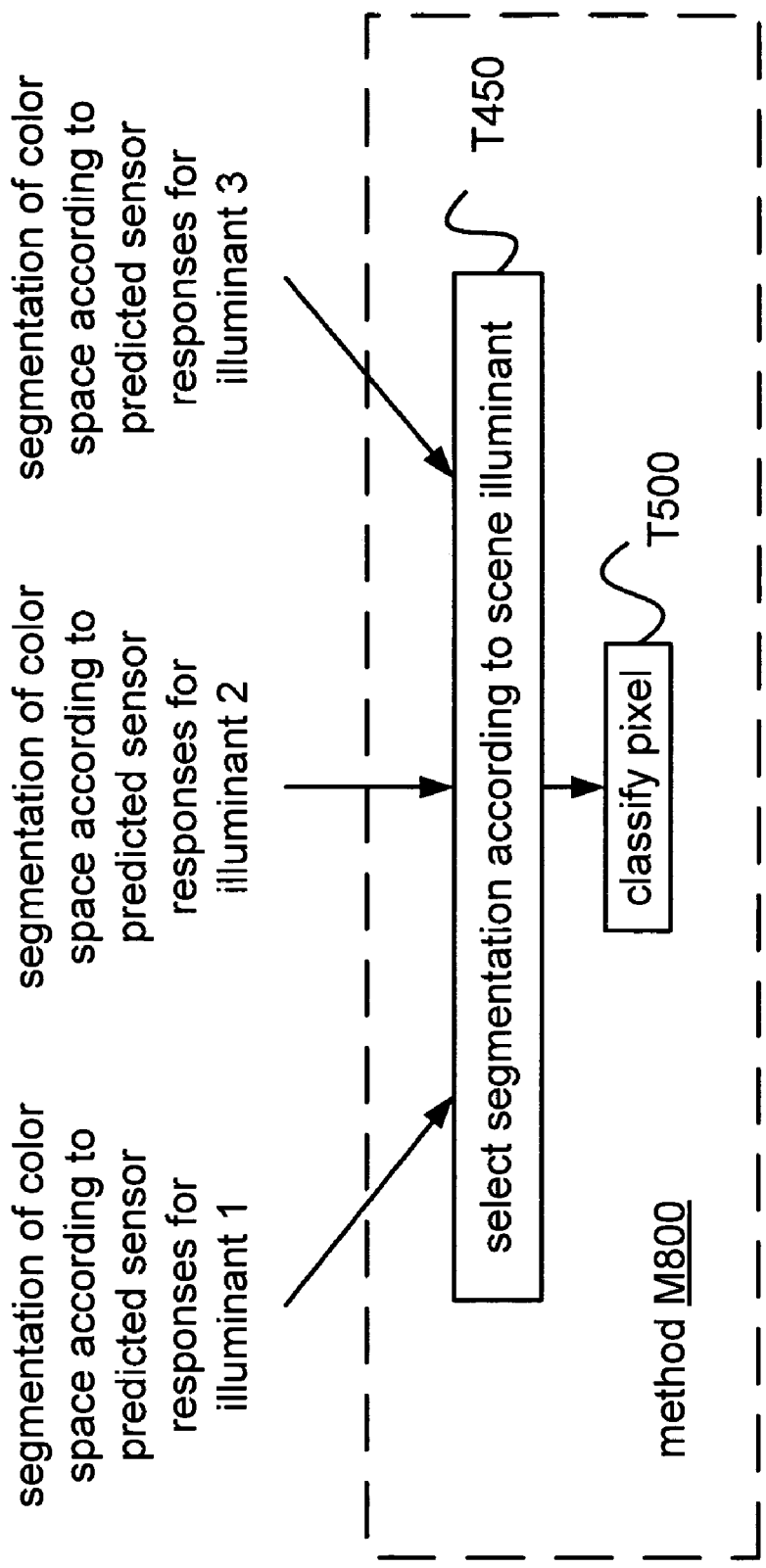
FIG. 15 shows a flowchart of an implementation M800 of method M700.

It may be desired to implement method M700 to select one among several different segmentations by which to classify a respective pixel. FIG. 15 shows a block diagram of an implementation M800 of method M700 that includes a task T450. Task T450 is configured to select one among several different segmentations according to a scene illuminant of the image being segmented. The scene illuminant may be identified from the image using any color constancy or illuminant estimation algorithm. In a scene having two or more surface colors, for example, a dichromatic reflection model may be applied to estimate the scene illuminant according to an intersection of dichromatic planes.

It may be desirable for task T450 to select a segmentation that is derived from samples taken under a reference illumination similar in spectral power distribution and/or color temperature to the estimated scene illuminant. However, it is possible that the estimated scene illuminant does not have a color characteristic sufficiently similar to that of any of the reference illuminants. In such case, task T450 may be configured to select a destination illuminant from among the reference illuminants and to apply a corresponding chromatic adaptation transformation to the image to be segmented. The adaptation transformation may be a linear transformation that is dependent on the reference white of the original image to be segmented and on the reference white of the destination illuminant. In one example, task T450 causes the color transformation to be applied to the image in a native color space of the sensor (such as an RGB space).

Figure 16:
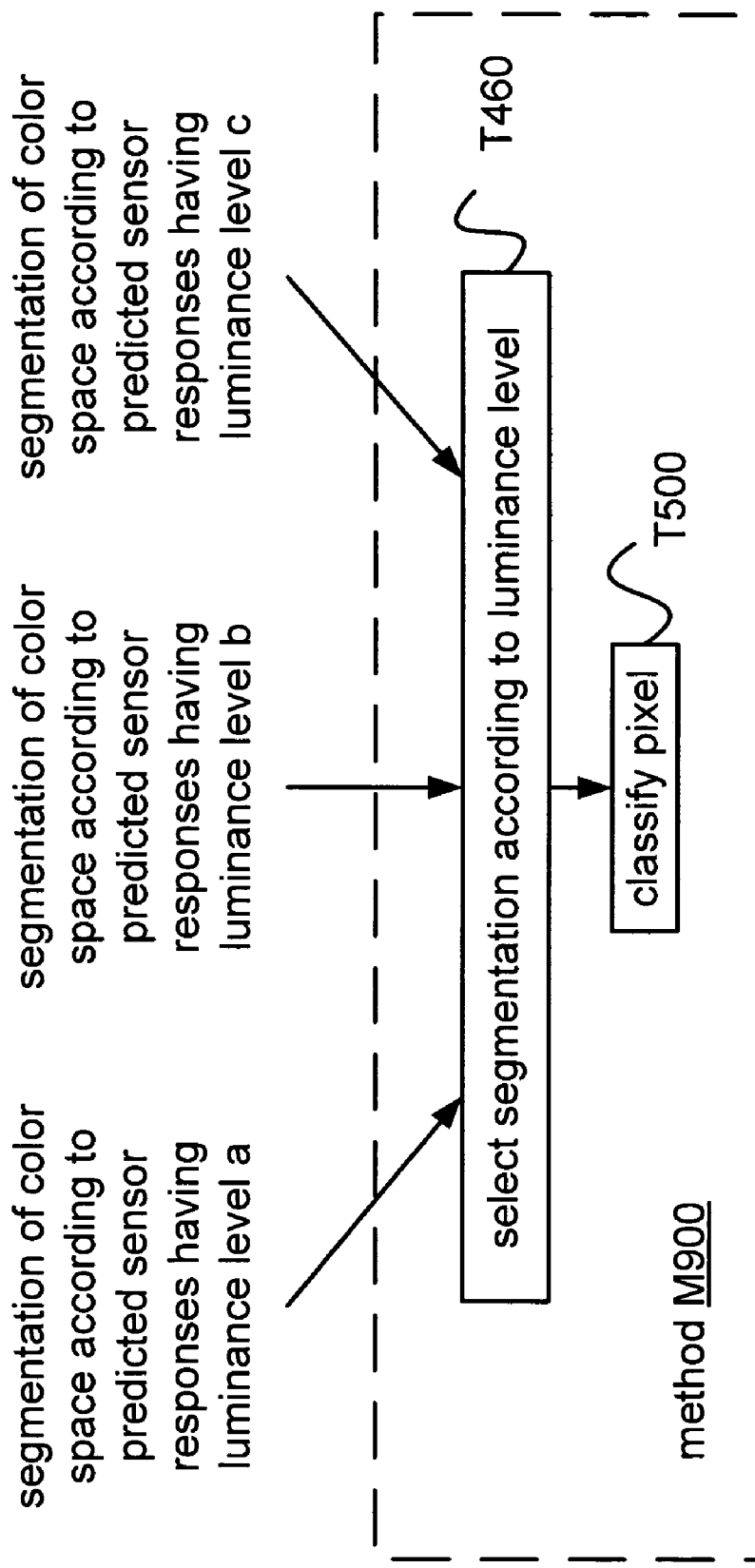
FIG. 16 shows a flowchart of an implementation M900 of method M700.

In another implementation, method M700 is configured to select one among several different segmentations according to a luminance level of the pixel. FIG. 16 shows a block diagram of such an implementation M900 of method M700 that includes a task T460. Task T460 is configured to select one among several different segmentations according to a luminance level of the pixel to be classified. For example, task T460 may be implemented to select from among ten equal luminance ranges $\{(0, 0.1], (0.1, 0.2], \ldots, (0.8, 0.9], (0.9, 1.0)\}$ as described above. Method M700 may be further implemented to classify each of a set of pixels of an image based on a segmentation selected according to both of tasks T450 and T460.

In one range of applications, a segmentation according to a training set of human skin tones is used to detect skin tones in images in real time. In such an application, the segmentation is used to identify one or more skin-tone areas in an image or sequence of images captured by the same sensor. This identification may then be used to support further operations such as enhancing an appearance of the identified region. For example, a different compression algorithm or ratio may be applied to different parts of the image such that a skin-tone region is encoded at a higher quality than other parts of the image.

In a tracking application such as a face-tracking operation, a skin-tone region in the image may be marked with a box that moves with the region across a display of the image in real-time, or the direction in which a camera is point may be moved automatically to keep the region within the field of view. A tracking operation may include application of a temporal filter such as a Kalman filter. In another application, one or more of the 3A operations of the camera (autofocus, auto-white balance, auto-exposure) is adjusted according to a detected skin-color region.

Although applications and uses involving skin color are described, it is expressly contemplated that test surfaces for other classes of objects may also be used. The test surfaces may represent another class of living objects such as a type of fruit, a type of vegetable, or a type of foliage. Classification of images according to predicted sensor values for such test surfaces may be performed to sort, grade, or cull objects. For example, it may be desired to determine one or more qualities such as degree of ripeness or presence of spoilage or disease, and the test surfaces may be selected to support a desired classification according to such application.

Other potential applications include industrial uses such as inspection of processed foodstuffs (to determine a sufficiency of baking or roasting based on surface color, for example).

Classification on the basis of color also has applications in geology. Other potential applications of a method as disclosed herein include medical diagnosis and biological research, in which the reflectance spectra of the test surface and targets need not be limited to the visible range.

Further applications of an implementation of method M700, M800, or M900 may include analyzing a segmentation map of the image to determine how much of the image has been classified as within the segment. Such a procedure may be useful in a fruit-sorting operation (for example, to determine whether a fruit is ripe) or in other food processing operations (for example, to determine whether a baked or roasted foodstuff is properly cooked).

FIG. 17A shows a block diagram of an apparatus 100 according to an embodiment. Sensor 110 includes an imaging sensor having a number of radiation-sensitive elements, such as a CCD or CMOS sensor. Sensor response predictor 120 calculates a set of predicted responses of sensor 110 according to implementations of method M100 as described herein. Color space segmenter 130 performs a segmentation of a color space based on the predicted sensor responses, according to one or more implementations of task T400 as described herein.

Sensor response predictor 120 may be implemented as one or more arrays of logic elements such as microprocessors, embedded controllers, or IP cores, and/or as one or more sets of instructions executable by such an array or arrays. Color space segmenter 130 may be similarly implemented, perhaps within the same array or arrays of logic elements and/or set or sets of instructions. In the context of a device or system including apparatus 100, such array or arrays may also be used to execute other sets of instructions, such as instructions not directly related to an operation of apparatus 100. For example, sensor response predictor 120 and color space segmenter 130 may be implemented as processes executing on a personal computer to which sensor 110 is attached, or which is configured to perform calculations on data collected from sensor 110 possibly by another device.

FIG. 17B shows a block diagram of an apparatus 200 according to an embodiment. Segmentation storage 140 stores one or more segmentations of a color space, each segmentation being derived from a corresponding set of predicted responses of sensor 110. Such segmentation or segmentations may be derived, without limitation, according to one or more implementations of a method M500 and/or M600 as described herein. Pixel classifier 150 classifies pixels of the image according to one or more of the segmentations of segmentation storage 140. Such classification may be performed, without limitation, according to one or more implementations of a method M700, M800, and/or M900 as described herein. Display 160 displays an image captured by sensor 110, which image may also be processed according to the classification performed by pixel classifier 150. Further implementations of apparatus 200 may include one or more lenses in the optical path of the sensor. Implementations of apparatus 200 may also include an infrared- and/or ultraviolet-blocking filter in the optical path of the sensor.

Segmentation storage 140 may be implemented as one or more arrays of storage elements such as semiconductor memory (examples including without limitation static or dynamic random-access memory (RAM), read-only memory (ROM), nonvolatile memory, flash RAM) or ferroelectric, ovonic, polymeric, or phase-change memory. Pixel classifier 150 may be implemented as one or more arrays of logic elements such as microprocessors, embedded controllers, or IP cores, and/or as one or more sets of instructions executable by such an array or arrays. In the context of a device or system including apparatus 200, such array or arrays may also be used to execute other sets of instructions, such as instructions not directly related to an operation of apparatus 200. In one example, pixel classifier 150 is implemented within a mobile station modem chip or chipset configured to control operations of a cellular telephone.

Pixel classifier 150 and/or apparatus 200 may also be configured to perform other signal processing operations on the image as described herein (such as black clamping, white balance, color correction, gamma correction, and/or color space conversion). Display 160 may be implemented as a LCD or OLED panel, although any display suitable for the particular application may be used. The range of implementations of apparatus 200 includes portable or handheld devices such as digital still or video cameras and portable communications devices including one or more cameras, such as a cellular telephone.

It should be understood that any discussion of color theory above serves to explain a motivation of the principles described herein and to disclose contemplated applications and extensions of such principles. No aspect of such discussion shall be limiting to any claimed structure or method unless such intent is expressly indicated by setting forth that aspect in the particular claim.

The foregoing presentation of the described embodiments is provided to enable any person skilled in the art to make or use the present invention. Various modifications to these embodiments are possible, and the generic principles presented herein may be applied to other embodiments as well. Methods as described herein may be implemented in hardware, software, and/or firmware. The various tasks of such methods may be implemented as sets of instructions executable by one or more arrays of logic elements, such as microprocessors, embedded controllers, or IP cores. In one example, one or more such tasks are arranged for execution within a mobile station modem chip or chipset that is configured to control operations of various devices of a personal communications device such as a cellular telephone.

An embodiment may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. The data storage medium may be an array of storage elements such as semiconductor memory (which may include without limitation dynamic or static RAM, ROM, and/or flash RAM) or ferroelectric, ovonic, polymeric, or phase-change memory; or a disk medium such as a magnetic or optical disk.

Although CCD and CMOS sensors are mentioned herein, the term "sensor" includes any sensor having a plurality of light-sensitive sites or elements, including amorphous and crystalline silicon sensors as well as sensors created using other semiconductors and/or heterojunctions. Thus, the range of embodiments is not intended to be limited to those shown above but rather is to be accorded the widest scope consistent with the principles and novel features disclosed in any fashion herein.

What is claimed is:

1. A method of characterizing a sensor, said method comprising:

obtaining a set of locations in a first color space, each location of the set based on a response of the sensor to a corresponding one of a plurality of targets, each of the plurality of targets having a different reflectance spectrum;

obtaining a set of parameters based on a decomposition of a first reflectance spectrum of at least one surface into a combination of the different reflectance spectrum of each of the plurality of targets;

calculating a plurality of predicted responses of the sensor, each of the plurality of predicted responses corresponding to one of a plurality of surfaces belonging to a desired segmentation class, wherein each of the plurality of surfaces has a second reflectance spectrum that is represented as a combination of the different reflectance spectrum of each of the plurality of targets, and wherein the plurality of predicted responses are based on the sets of locations and parameters, wherein the method is performed by one or more arrays of logic elements.

2. The method of characterizing a sensor according to claim 1, wherein said set of parameters is a coefficient vector, each element of the coefficient vector corresponding to the reflectance spectrum of a different one of the plurality of targets.

3. The method of characterizing a sensor according to claim 1, said method further comprising obtaining a predicted response of the sensor to each of a plurality of human skin surfaces.

4. The method of characterizing a sensor according to claim 1, wherein each of the set of locations in the first color space is based on a response of the sensor to a corresponding one of the plurality of targets under a first illumination, and wherein said obtaining the plurality of predicted responses of the sensor comprises:

obtaining a second set of locations in the first color space, each of the second set of locations being based on a response by the sensor to a corresponding one of the plurality of targets under a second illumination having a different spectral power distribution than the first illumination; and based on the second set of locations, obtaining a predicted response of the sensor to each of the plurality of surfaces.

5. The method of characterizing a sensor according to claim 1, wherein obtaining a set of parameters based on a decomposition of the first reflectance spectrum of at least one surface further includes:

obtaining a plurality of sets of parameters, each of the plurality of sets of parameters being based on a decomposition of a third reflectance spectrum of a corresponding one of the plurality of surfaces into a combination of the different reflectance spectrum of each of the plurality of targets, wherein said obtaining the plurality of predicted responses of the sensor is based on the plurality of sets of parameters.

6. The method of characterizing a sensor according to claim 1, said method further comprising calculating a segmentation of a second color space based on the plurality of predicted responses of the sensor.

7. The method of characterizing a sensor according to claim 6, wherein said calculating the segmentation of the second color space comprises calculating, based on the plurality of predicted responses of the sensor, a plurality of segmentations of the second color space, each segmentation corresponding to a different portion of a range of luminance values.

8. The method of characterizing a sensor according to claim 6, wherein the first color space is a primary color space and the second color space is a luminance-chrominance color space.

9. The method of characterizing a sensor according to claim 1, wherein said plurality of predicted responses includes a predicted response based on a simulated response of the sensor to a corresponding one of the targets.

10. The method of characterizing a sensor according to claim 9, wherein the simulated response of the sensor is based on a determined noise characteristic of the sensor.

11. The method of characterizing a sensor according to claim 1, said method further comprising classifying, according to the segmentation, each of a plurality of pixels of an image captured by the sensor.

12. The method of characterizing a sensor according to claim 11, said method further comprising classifying each of the plurality of pixels as a human skin tone.

13. The method of claim 1, further comprising decomposing the first reflectance spectrum of the at least one surface into a combination of the different reflectance spectrum of each of the plurality of targets.

14. A non-transitory data storage medium comprising instructions that when executed, by one or more arrays of logic elements, perform a method of characterizing a sensor, the method comprising:
   obtaining a set of locations in a first color space, each location of the set based on a response of the sensor to a corresponding one of a plurality of targets, each of the plurality of targets having a different reflectance spectrum;
   obtaining a set of parameters based on a decomposition of a first reflectance spectrum of at least one surface into a combination of the different reflectance spectrum of each of the plurality of targets; and
   calculating a plurality of predicted responses of the sensor, each of the plurality of predicted responses corresponding to one of a plurality of surfaces belonging to a desired segmentation class, wherein each of the plurality of surfaces has a second reflectance spectrum that is represented as a combination of the different reflectance spectrum of each of the plurality of targets, and wherein the plurality of predicted responses are based on the sets of locations and parameters.

15. The non-transitory data storage medium of claim 14, wherein the data storage medium comprises at least one of RAM, ROM, flash RAM, magnetic disk, and optical disk.

16. The non-transitory data storage medium of claim 14, wherein at least a portion of the plurality of predicted responses of the sensor correspond to a plurality of human skin surfaces.

17. The non-transitory data storage medium of claim 14, wherein the set of parameters is based on decomposing reflectance spectra of each of a plurality of skin tone surfaces into a linear combination of reflectance spectra of the plurality of targets.

18. The non-transitory data storage medium of claim 14, wherein the method further comprises decomposing the first reflectance spectrum of the at least one surface into a combination of the different reflectance spectrum of each of the plurality of targets.

19. A method of determining skin color statistics for a sensor, said method comprising:
   obtaining a set of locations in a color space corresponding to a plurality of testing targets, each of the plurality of testing targets having a different reflectance spectrum;
   obtaining a set of parameters based on decompositions of reflectance spectra of each of a plurality of skin tone surfaces into a combination of the different reflectance spectrum of each of the plurality of targets;
   determining skin color statistics for the sensor based on said decompositions, the skin color statistics including predicted responses of the sensor to each of the plurality of skin tone surfaces;
   performing a segmentation of the color space based on the predicted responses of the sensor; and
   classifying pixels of an image captured by the sensor according to pixel values and the segmentation of the color space,
   wherein the method is performed by one or more arrays of logic elements.

20. The method of claim 19, further comprising:
   capturing an image with the sensor; and
   detecting a skin tone area of the image captured by the sensor based on the skin color statistics of the sensor.

21. The method of claim 19, wherein the skin color statistics include a set of predicted sensor responses to each of a plurality of illuminants.

22. A method of determining skin color statistics for a sensor, further comprising:
   obtaining a set of locations in a color space corresponding to a plurality of testing targets, each of the plurality of testing targets having a different reflectance spectrum;
   obtaining a set of parameters based on decompositions of reflectance spectra of each of a plurality of skin tone surfaces into a combination of the different reflectance spectrum of each of the plurality of targets;
   determining skin color statistics for the sensor based on said decompositions, the skin color statistics including a set of predicted sensor responses to each of a plurality of illuminants;
   performing a plurality of segmentations of the color space for each of the plurality of illuminants based on the skin color statistics for the sensor;
   selecting one of the plurality of segmentations of the color space based on a scene illuminant of an image captured by the sensor; and
   classifying pixels of the image captured by the sensor based on the selected segmentation of the color space,
   wherein the method is performed by one or more arrays of logic elements.

23. The method of claim 22, further comprising:
   capturing an image with the sensor; and
   detecting a skin tone area of the image captured by the sensor based on the skin color statistics of the sensor.

* * * * *